(12) United States Patent
Hager et al.

(10) Patent No.: US 6,638,637 B2
(45) Date of Patent: Oct. 28, 2003

(54) ORIENTED MULTILAYER POLYOLEFIN FILMS

(75) Inventors: Patrick J. Hager, Woodbury, MN (US); Joseph T. Bartusiak, Osseo, MN (US); Kevin M. Hamer, St. Paul, MN (US); Randall E. Kozulla, Stillwater, MN (US); Martin E. Denker, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 193 days.

(21) Appl. No.: 09/766,707

(22) Filed: Jan. 22, 2001

(65) Prior Publication Data

US 2003/0049436 A1 Mar. 13, 2003

Related U.S. Application Data

(60) Provisional application No. 60/182,739, filed on Feb. 16, 2000.

(51) Int. Cl.[7] ............................................. B32B 27/32
(52) U.S. Cl. ..................... 428/516; 428/354; 428/906; 428/910
(58) Field of Search .................... 525/240; 428/516, 428/354, 906, 910

(56) References Cited

U.S. PATENT DOCUMENTS

| | | | |
|---|---|---|---|
| 3,241,662 A | 3/1966 | Robinson et al. | 206/523 |
| 3,324,218 A | 6/1967 | Gebler et al. | 526/348.1 |
| 3,887,745 A | 6/1975 | Yoshii et al. | 428/213 |
| 3,952,073 A | 4/1976 | Isaka et al. | 525/240 |
| 4,045,515 A | 8/1977 | Isaka et al. | 428/220 |
| 4,137,362 A | 1/1979 | Miki et al. | 428/337 |
| 4,330,499 A | 5/1982 | von und zu Aufsess et al. | 264/289.6 |
| 4,335,069 A | 6/1982 | Levy | 264/290.2 |

(List continued on next page.)

FOREIGN PATENT DOCUMENTS

| | | |
|---|---|---|
| EP | 033 824 | 4/1985 |
| EP | 0 600 246 A1 | 6/1994 |
| JP | 76032668 B | 9/1976 |
| JP | 53034834 | 3/1978 |
| JP | 11-1998835 | 7/1999 |
| WO | WO 99/29794 | 6/1999 |

OTHER PUBLICATIONS

Cornelia Vasile and Raymond B. Seymour, Handbook of Polyolefins, pp. 140–142. (Undated).
Robert J. Samuels, Structured Polymer Properties, The Identification and Application of Crystalline Polymer Structure, pp. 243–248. (Undated).
W.B. Lee, S.Z. Wu, and M.S. Song, Characterization of the Orientation Structure and Distribution in Rolled Polypropylene, ASM International, Oct., (1996), vol. 5 (5), pp. 637–645.
Encyclopedia of Polymer Science and Engineering, (14), New York, John Wiley & Sons, pp. 552–562. (1985).
M. Ahmed, Polypropylene Fibers—Science and Technology, pp. 159–161 (1982).

(List continued on next page.)

*Primary Examiner*—D. Lawrence Tarazano
(74) *Attorney, Agent, or Firm*—James J. Trussell; George W. Jonas

(57) ABSTRACT

A multi-layered biaxially oriented film comprising at least one primary layer and at least one secondary layer, wherein the primary layer comprises a propylene copolymer having a first melting point and the secondary layer comprises a polypropylene homopolymer or copolymer having a second melting point, such that the second melting point is greater than the first melting point and the multi-layered construction is biaxially stretched. The multi-layered film further includes a surface finishing layer, to provide a writable multi-layered film. This stretched film exhibits a refractive index in the machine direction (MD) that is greater than the refractive index measured in the transverse direction (TD).

69 Claims, 9 Drawing Sheets

U.S. PATENT DOCUMENTS

| | | | |
|---|---|---|---|
| 4,393,115 A | 7/1983 | Yoshii et al. | 428/323 |
| 4,410,582 A | 10/1983 | Tsunashima et al. | 428/212 |
| 4,414,261 A | 11/1983 | Nanbu | 428/213 |
| 4,447,485 A | 5/1984 | Aritake | 428/144 |
| 4,451,533 A | 5/1984 | Wong et al. | 428/337 |
| 4,513,028 A | 4/1985 | Aritake | 427/173 |
| 4,595,738 A | 6/1986 | Hufnagel et al. | 526/348.1 |
| 4,675,582 A | 6/1987 | Hommes et al. | 318/38 |
| 4,825,111 A | 4/1989 | Hommes et al. | 310/12 |
| 4,853,602 A | 8/1989 | Hommes et al. | 318/38 |
| 4,908,278 A | 3/1990 | Bland et al. | 428/500 |
| 4,960,637 A | 10/1990 | Biczenczuk | 428/314.4 |
| 5,036,262 A | 7/1991 | Schonbach | 318/38 |
| 5,036,363 A | 7/1991 | Iida et al. | 355/246 |
| 5,072,493 A | 12/1991 | Hommes et al. | 26/72 |
| 5,091,237 A | 2/1992 | Schloegl et al. | 428/215 |
| 5,096,770 A * | 3/1992 | Bothe | 428/216 |
| 5,364,704 A | 11/1994 | Murschall et al. | 428/516 |
| 5,366,796 A | 11/1994 | Murschall et al. | 428/216 |
| 5,416,228 A | 5/1995 | Ewen et al. | 556/7 |
| 5,425,990 A | 6/1995 | Blum et al. | 428/337 |
| 5,474,820 A | 12/1995 | Murschall et al. | 428/35.7 |
| 5,501,905 A | 3/1996 | Krallmann et al. | 428/339 |
| 5,691,043 A * | 11/1997 | Keller et al. | 428/212 |
| 5,700,489 A | 12/1997 | Pottorff | 425/72.1 |
| 6,022,612 A * | 2/2000 | Wilkie | 428/215 |

OTHER PUBLICATIONS

M. Ahmed, Polypropylene Fibers—Science and Technology, pp. 26–29, (1982).

Albert J. De Vries, Structure–Properties Relationships in Biaxially Oriented Polypropylene Films, Polymer Engineering and Science, Apr., (1983) vol. 23 (5), pp. 241–246.

Zigmond W. Wilchinsky, Measurement of Orientation in Polypropylene Film, Journal of Applied Physics, pp. 1969–1972, (1960).

D.E. Grant and S.F. Dieckmann, Some Melt Flow Properties of Polypropylene, Journal of Applied Polymer Science, pp. 3231–3244 (1965).

TH. G. Scholte, N.L.J. Meijerink, H.M. Schoffeleers, and A.M.G. Brands, Mark–Houwink Equation and GPC Calibration for Linear Short–Chain Branched Polyolefins, Including Polypropylene and Ethylene–Propylene Copolymers, Journal of Applied Polymer Science, pp. 3763–3782, (1984).

Die Makromolekulare Chemie, vol. 128, The Intrinsic Ciscosity–Molecular Weight Relationship for Polypropylene, Kinya Yamaguchi, pp. 19–30, (1969).

J.B. Kinsinger and R.E. Hughes, Intrinsic Viscosity–Molecular Weight Relationships for Isotactic and Atactic Polypropylene, vol. 63, pp. 2002–2007, (1959).

Encyclopedia of Ploymer Science and Engineering, (10), New York, John Wiley & Sons, pp. 605–608. (1985).

* cited by examiner

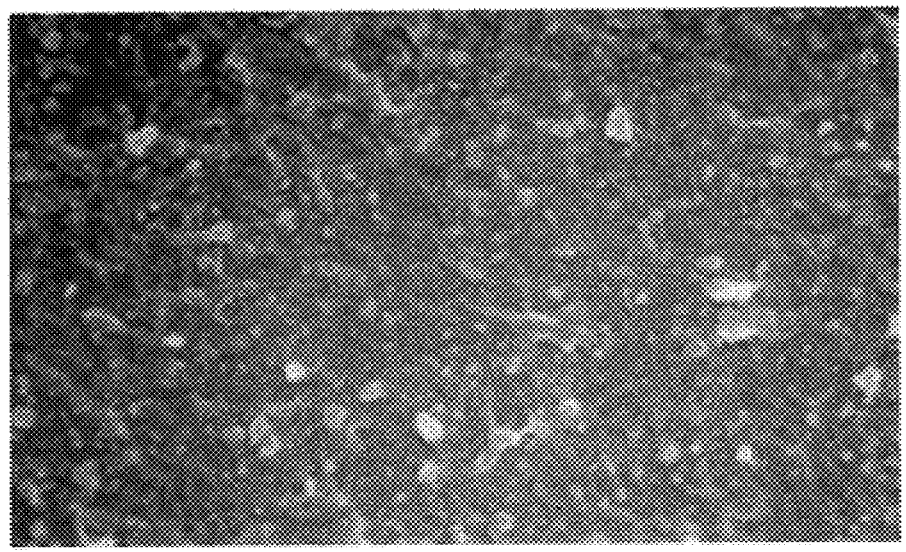
Fig. 13  200μm
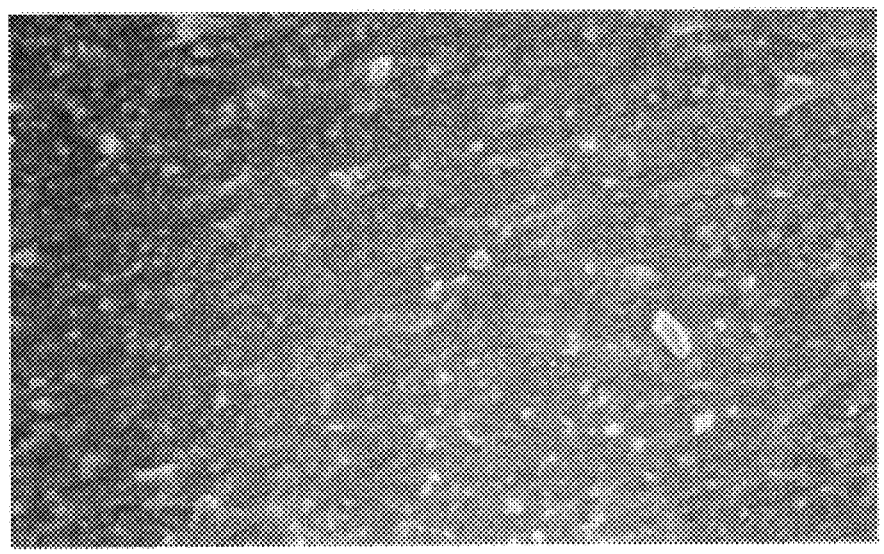
Fig. 14  200μm

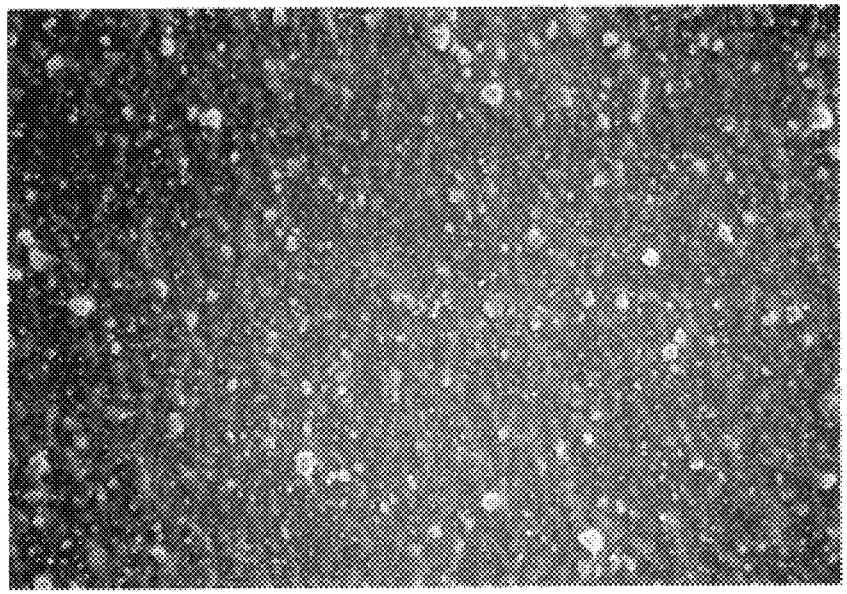
Fig. 19  200μm
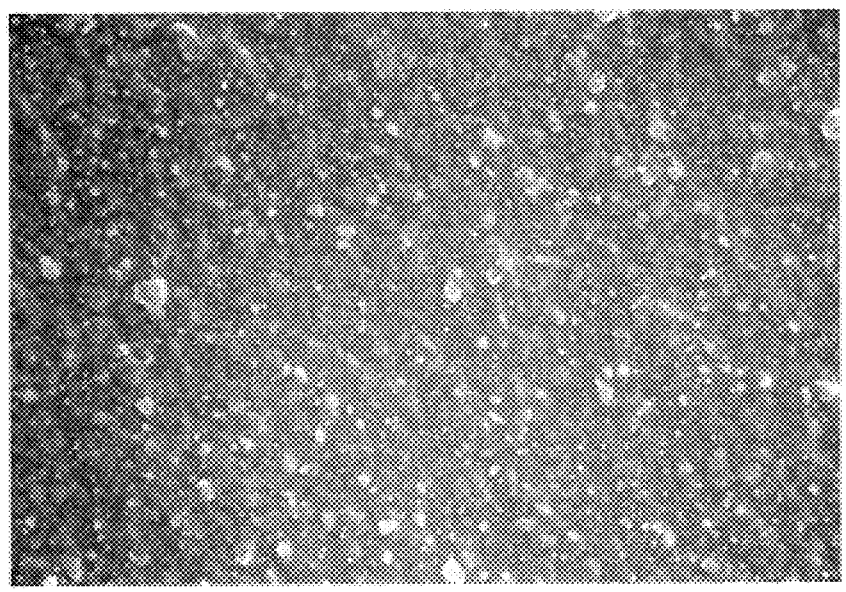
Fig. 20  200μm

ORIENTED MULTILAYER POLYOLEFIN FILMS

CROSS REFERENCE TO RELATED APPLICATIONS

This application claims priority to Provisional Application Serial No. 60/182,739, filed Feb. 16, 2000.

FIELD OF THE INVENTION

The present invention generally relates to films useful as tape backings, and more particularly to multilayer laminate biaxially-oriented backings comprising a propylene-containing primary layer and at least one polyolefin-containing secondary layer and further including a surface finishing layer, such as a surface matte layer.

BACKGROUND OF THE INVENTION

Commercially available pressure sensitive adhesive tapes are usually provided in a roll form and can be provided on a tape dispenser (see e.g. U.S. Pat. Nos. 4,451,533 and 4,908,278). Typically, commercially available dispensers have either a metal or plastic serrated cutting blade. In the case where no dispenser is provided, it is desirable that the tape can be torn by hand.

"Severability" of adhesive tape is defined as the ability to cut or sever a length of tape by pulling the tape over the teeth on the serrated cutting edge of a tape dispenser with a desired amount of energy or work. Severability is also referred to as "dispensability." It is desired that the severed tape does not chip, sliver, fracture or break in an unpredictable manner (see U.S. Pat. Nos. 4,451,533 and 4,908,278). Such severability is desirable to produce a cleanly serrated cut edge on the severed tape strip.

Adhesive tapes are produced from many different films. Films that tend to be too tough and stretch significantly before breaking while under load, render such films extremely difficult to sever, particularly on a plastic bladed dispenser. Tape dispensers with plastic cutting blades are commonly used for hand-held units such as a Catalog No. 104 3M Magic™ tape dispenser, available from Minnesota Mining and Manufacturing Company, St. Paul, Minn. However, dispensers with plastic cutting blades are typically not sharp and durable enough to sever oriented polypropylene tapes. For this reason, typical dispensers for biaxially oriented polypropylene tape usually are equipped with sharp metal blades. Such metal blade dispensers are more costly and difficult to manufacture than dispensers with plastic blades.

Biaxially oriented isotactic polypropylene films are well known for their toughness, low cost, good color, moisture and slivering resistance, and clarity and have long been used as adhesive tape backings (see U.S. Pat. Nos. 3,241,662 and 3,324,218). Although, as stated above such films are more difficult to dispense, particularly using a plastic dispenser. In addition, such films are considered very difficult to tear by hand and are typically slit with roughened or flattened rotary blades in order to provide sufficient edge defects to allow some degree of finger tearability. This process results in non-uniform, unsightly edges and much reduced tape strength.

There have been several attempts to improve polyolefin films to produce severable and finger tearable adhesive tape backing films.

For example, JP 53034834 describes a mixture of polypropylene with low molecular weight polyolefins in order to produce a more brittle, finger tearable film backing. U.S. Pat. No. 3,887,745 describes a 2-layer polypropylene tape in which a thick secondary layer is uniaxially oriented in the transverse (or perpendicular) direction to facilitate straight line tearing in the tape crosswise direction. Similarly, U.S. Pat. No. 3,952,073 and U.S. Pat. No. 4,045,515 describe tape backings comprising blends of isotactic polypropylene with random propylene-ethylene copolymers, which are sequentially oriented to give a film having greater orientation in the transverse than in the machine direction in order to produce film having good finger tearability across the film.

U.S. Pat. No. 4,410,582 describes a sequentially biaxially oriented multilayer film consisting of a low molecular weight polyolefin primary layer having a melting point lower than higher crystallinity secondary layers in order to produce a finger tearable film backing. U.S. Pat. No. 4,137,362 describes adhesive tape backings produced by the sequential biaxial orientation of single layer blends of isotactic polypropylene with other polyolefins. U.S. Pat. No. 4,393,115 and U.S. Pat. No. 4,414,261 and JP Application 11-1998835 describe sequentially biaxially oriented multilayer films which include polypropylene-ethylene block copolymer or hydrocarbon resins in blends or layers, which are intended to promote finger tearability by increasing the film's brittle behavior.

Similarly, U.S. Pat. No. 4,447,485 and U.S. Pat. No. 4,513,028 describe stretched film having a base sheet comprising polypropylene blended with polymethylpentene, the latter present to produce a more brittle construction. JP Application 6-305014 describes a single composition, single sheet film comprising a polypropylene-ethylene copolymer which develops a secondary/primary structure due to thermal processing conditions using a sequential biaxial orientation process.

Pressure sensitive adhesive tapes with a matte surface opposite the adhesive coated surface are commonly sold for use in offices, retail shops and schools. These tapes are typically used in conjunction with paper, for mending tears, posting memos, and attaching documents together, and as such, it is preferred that the pressure sensitive tape remain invisible in its final use, yet allow for any printing underneath to be viewed and photocopied clearly and cleanly. Additionally, it is preferred that the matte surfaces of these tapes can be written on with a variety of writing instruments, such as ball-point pens, pencils and permanent markers. Cellulose acetate film with an embossed matte finish has been predominantly used as the substrate for matte adhesive tape due to its excellent optical properties and write-on characteristics.

Biaxially oriented polypropylene (BOPP) films are widely used as film substrates for adhesive tapes due to their excellent strength, moisture resistance and low cost. Generally, BOPP films cannot be imparted with a matte and/or writable surface simply by embossing the surface of the film. Typically, such methods involve the provision of an additional layer atop the base polypropylene layer of the BOPP film, wherein some of the desired properties of a matte or writable surface are provided by the additional layer.

Such known additional layers have frequently been produced by combining two or more polymers in the form of a blend. At least one of the polymers in such a blend is usually a polyolefin, as this provides adhesion to the polypropylene main layer in the BOPP film. Polyolefin-based components in such blends have included polypropylene, co- or terpolymers based on propylene, polyethylenes such as high density polyethylene (HDPE), polypropylene/polyethylene block copolymers, ethylene based co- or terpolymers modified with polar groups, polymers containing butene-1 monomer, and methylepentene polymer. Non-polyolefin components in such blends have included thermoplastics such as polystyrene, polyamides, polyalkyl metbacrylates, and polyesters. Additionally, some of the known additional layer compositions have included inorganic fillers, such as silica, calcium carbonate, or clay. Examples of such known additional layers can be found in U.S. Pat. Nos. 5,501,905, 5,474,820, 5,425,990, 5,366,796, 5,364,704, 4,960,637, 4,513,028, 4,447,485. EP 03382431, and JP 76032668B.

The problem remains, however, that none of the known methods satisfactorily provides a matte surface that combines all of the desirable attributes of a matte appearance, is writable with pencil, ball-point pen, and permanent ink markers, does not "ghost" on photocopying, and is easy to produce. In particular, there is a need for a matte layer composition that provides all the aforementioned properties but does not require slow cooling of the extruded film sheet to optimize the matte appearance, and does not limit the temperature range useful for stretching the film.

However, none of the alternatives set forth above provides an adhesive tape backing combining all the desirable attributes of strength, easy dispensability, easy finger tear, good clarity, good mechanical strength, and cost effectiveness.

SUMMARY OF THE INVENTION

Briefly, in one aspect of the present invention, a multi-layered biaxially oriented film is provided comprising at least one primary layer and at least one secondary layer, wherein the primary layer comprises a propylene-containing polymer having a first melting point and the secondary layer comprises a propylene-containing polymer having a second melting point, such that the second melting point is greater than the first melting point and the multi-layered construction is biaxially stretched. Preferably, this stretched film exhibits a crystalline orientation as determined by wide angle X-ray scattering (WAXS) measurements from the monoclinic (110) crystalline planes that is isotropic or exhibits at most a single specific azimuthal scan maximum, said maximum being positioned at an angle of up to ±75° from the machine direction (MD). The single azimuthal scan maximum in addition possesses an angular full width at half peak height (FWHM) between about 40° to 75°.

In a further embodiment, each layer may be comprised of homopolymers, copolymers, blends and the like. In such an embodiment, the present invention provides a multilayer film wherein (a) the primary layer comprises at least 50% of the total multilayer thickness (excluding an adhesive composition layer) and contains at least 50% of a first polymer component, denoted as the major component of the primary layer, and (b) the secondary layer contains at least 50% of a second polymer component, denoted as the major component of the secondary layer(s) such that the differential scanning calorimetry melting point ($MP_{dsc}$) of the second polymer component is greater than the $MP_{dsc}$ of the first polymer component.

Optional polymer components may also be included in the primary layer. Furthermore, the optional polymer component of the primary layer may have a $MP_{dsc}$ about the same or different than the first polymer component, provided that this optional polymer component or components are present in levels so that desirable film attributes are maintained. The optional polymer component(s) may be any suitable polymer. Generally, to obtain desirable low levels of haze, optional polymer components include polyolefin-containing polymers, such as homopolymers, copolymers, terpolymers and the like, more preferably homopolymers or copolymers of polypropylene.

Optional intermediate layers may be used, and can be composed predominantly of either the primary layer or secondary layer polymer, or may be a blend or mixture of the two and further may contain additional components so as to optimize processability and film properties. In order to aid processability, it is preferred that the melt flow rate (MFR) of the various layers has similar values.

Advantageously, the present invention provides severable and finger tearable adhesive polyolefin-based tapes exhibiting a combination of characteristics, particularly low puncture resistance, low finger tear resistance, low haze, low tensile strength in the MD and a refractive index difference ($\Delta_n$).

The film is biaxially stretched so as to provide a unique film having a combination of the many preferred and useful characteristics. The films of the present invention do not necessarily exhibit all of the characteristics in a single embodiment, but rather the film is such that the characteristics can be tailored for specific purposes. Useful characteristics include but are not limited to:

1. A crystalline orientation determined by wide angle X-ray scattering (WAXS) measurements from the monoclinic (110) crystalline planes that is isotropic or exhibits at most a single specific azimuthal scan maximum.
2. The maximum being positioned at an angle within about ±75°, preferably about ±45°, and more preferably about ±25° with respect to reference MD.
3. The breadth of the single azimuthal scan maximum (the angular full width at half peak maximum) of from about 40° to about 75°.
4. A melting point difference between the major components of the primary and secondary layers of at least about 2° C. as measured using differential scanning calorimetry (DSC) as described herein, preferably at least about 5° C. and more preferably at least about 8° C., wherein the melting point of the primary layer is lower than the melting point of the secondary layer.
5. A refractive index difference, calculated by subtracting the refractive index measured in the TD from that in the MD, greater than about $-3.0 \times 10^{31\ 3}$, preferably greater than or equal to zero.
6. Puncture energy up to 20 J/cm$^2$, preferably up to 15 J/cm$^2$, and more preferably up to 10 J/cm$^2$ when 2.54 cm wide samples are tested by the method set out below, or up to 90 J/cm$^2$ when 1.27 cm wide samples are tested by the method set out below.
7. Puncture elongation up to about 1.3 cm, preferably up to about 1.0 cm when 2.54 cm wide samples are tested by the method set out below, or up to 2.0 cm when 1.27 cm wide samples are tested by the method set out below.
8. Tensile strength up to 140 MPa in the MD.
9. A transmission haze of the primary and secondary layers according to ASTM D 1003-97 of less than about 4.0%, preferably less than about 2.0%, and more preferably less than about 1.0%.

In one preferred embodiment, the present invention provides a film comprising at least one primary layer and at least one secondary layer, wherein the primary layer comprises a major component of a propylene-containing polymer having a first melting point and the secondary layer comprises a major component propylene-containg polymer having a second melting point, such that the second melting point is greater than the first melting point and the multi-layered construction is biaxially stretched, wherein the stretched film exhibits a crystalline orientation as determined by wide angle x-ray scattering (WAXS) measurements from the monoclinic (110) crystalline planes that exhibits no distinct peak and at most a single specific azimuthal scan maximum, said maximum being positioned at an angle of up to ±75° from the machine direction (MD). The single azimuthal scan maximum in addition possesses an angular full width at half peak height (FWHM) between about 40° to 75°.

In another embodiment, the present invention provides a film comprising at least one primary layer and at least one secondary layer, wherein the primary layer comprises a major component of a propylene-containing polymer having a first melting point and the secondary layer comprises a major component propylene-containing polymer having a second melting point, such that the second melting point is greater than the first melting point and the multi-layered construction is biaxially stretched, wherein the stretched film exhibits a refractive index difference, calculated by subtracting the refractive index measured in the TD from that in the MD, greater than about $-3.0 \times 10^{-3}$.

In another embodiment, the present invention provides a film comprising at least one primary layer and at least one secondary layer, wherein the primary layer comprises a major component of a propylene-containing polymer having a first melting point and the secondary layer comprises a major component propylene-containing polymer having a second melting point, such that the second melting point is greater than the first melting point and the multi-layered construction is biaxially stretched, wherein the stretched film exhibits a refractive index in the machine direction (MD) about the same or greater than that in the transverse direction (TD); put another way, the refractive index difference, calculated by subtracting the refractive index measured in the TD from that in the MD, is greater than or equal to zero. If this difference is about zero then the film orientation is said to be isotropic.

In yet another embodiment, the present invention provides a film comprising at least one primary layer and at least one secondary layer, wherein the primary layer comprises a major component of a propylene-containing polymer having a first melting point and the secondary layer comprises a major component propylene-containing polymer having a second melting point, such that the second melting point is greater than the first melting point and the multi-layered construction is biaxially stretched, wherein the stretched film exhibits a crystalline orientation as determined by wide angle x-ray scattering (WAXS) measurements from the monoclinic (110) crystalline planes that is isotropic or exhibits at most a single specific azimuthal scan maximum, said maximum being positioned at an angle of up to ±75° from the machine direction (MD), and a refractive index difference, calculated by subtracting the refractive index measured in the TD from that in the MD, greater than about $-3.0 \times 10^{-3}$.

In yet another embodiment, the present invention provides a film comprising at least one primary layer and at least one secondary layer, wherein the primary layer comprises a major component of a propylene-containing polymer having a first melting point and the secondary layer comprises a major component propylene-containing polymer having a second melting point, such that the second melting point is greater than the first melting point and the multi-layered construction is biaxially stretched, wherein the stretched film exhibits a crystalline orientation as determined by wide angle x-ray scattering (WAXS) measurements from the monoclinic (110) crystalline planes that is isotropic or exhibits at most a single specific azimuthal scan maximum, said maximum being positioned at an angle of up to ±75° from the machine direction (MD), and a refractive index difference, calculated by subtracting the refractive index measured in the TD from that in the MD, greater than or equal to zero.

To provide for different surface finishes, at least one surface finishing layer may be included and is not limited to compositions providing writable or matte surfaces, release surfaces, and the like.

In an alternative embodiment, a matte surface multi-layered film is provided comprising at least one primary layer, at least one secondary layer and at least one surface finishing layer, wherein the primary layer comprises a propylene-containing polymer having a first melting point, the secondary layer comprises a propylene-containing polymer having a second melting point, such that the second melting point is greater than the first melting point, and the surface finishing layer comprises a blend or mixture of incompatible polyolefins that produce a phase-separated system, and an inorganic or organic filler particle such that the surface finishing layer has a matte appearance and the multi-layered film is biaxially stretched.

Advantageously, the matte surface multi-layered films of the present invention are significantly free of voids or cracks, with haze of 70–90% and total percent light transmittance of greater than 90% as measured by ASTM D1003 ("Haze and Luminous Transmittance of Transparent Plastics"), gloss of less than or equal to 10% as measured at an incident angle of 60° by ASTM D2457-97 ("Specular Gloss of Plastic Films and Solid Plastics"). Further, the surface finishing layer can be a writable layer using the likes of pencil, ballpoint pen, or permanent marker.

Advantageously, films of the present invention may be hand tearable. It has been found that when a film has puncture energy of up to 10 J/cm$^2$ (as tested on a 2.54 cm wide sample) and a tensile strength of up to 100 MPa, the film is moderately easy to tear by hand. When the film has a puncture energy of up to 5 J/cm$^2$ (as tested on a 2.54 cm wide sample) and a tensile strength of up to 50 MPa, the film is easier to tear by hand.

Additionally, all of the embodiments may be constructed in such a way as to include additional primary, secondary and surface finishing layers, such as a construction comprising a first primary layer, a secondary layer and a second primary layer. Furthermore, intermediate layers may also be used, and include tie layers, primer layers, barrier layers and the like. Protective layers may also be added, without limiting the scope of the present invention. The multi-layered films provided for above can be coated with an adhesive layer to make hand tearable, dispensible, writable, matte and any combinations thereof.

The present invention provides films described above, tape backings made from such films, tapes including the backings, and methods of making the films, backings, and tapes.

As used in this application:

"biaxially stretched," when used herein to describe a film, means the film has been stretched in two different directions, a first direction and a second direction, in the plane of the film. Typically, but not always, the two directions are substantially perpendicular and are in the longitudinal or machine direction ("MD") of the film (the direction in which the film is produced on a film-making machine) and the transverse direction ("TD") of the film (the direction perpendicular to the MD of the film). The MD is sometimes referred to as the Longitudinal Direction ("LD"). Biaxially stretched films may be sequentially stretched, simultaneously stretched, or stretched by some combination of simultaneous and sequential stretching. Further, such stretching can result in films that are balanced or unbalanced. Films having an anisotropic molecular orientation may exhibit anisotropy aligned parallel to any major film axis, so long as the desirable property attributes described herein are met.

"birefringence" when used herein to describe a film means the film has different refractive index values as measured along two perpendicular axes within the plane of the film, that is, the plane normal to the incident linearly polarized light used to measure the refractive index. This so-called "in-plane" birefringence is the difference in the refractive index parallel to a defined direction and that measured perpendicular to the first direction (Encyclopedia of Polymer Science and Engineering, 2cd ed., v. 14, pp. 552–562, Wiley-Interscience, NY (1987). In the present case, the birefringence (denoted ($\Delta n_{M-T}$)) is defined as the value of the refractive index measured parallel to the machine or longitudinal direction (denoted $n_M$) minus that measured perpendicular to the machine direction (denoted $n_T$):

$$(\Delta n_{M-T}) = n_M - n_T.$$

where the measured value of the refractive indices is accurate to the fourth digit (Encyclopedia of Polymer Science and Engineering, 2cd ed., v. 10, p 605–608, Wiley-Interscience, NY (1987)).

"simultaneously biaxially stretched," when used herein to describe a film, means that significant portions of the stretching in each of the two directions are performed simultaneously.

"stretch ratio," as used herein to describe a method of stretching or a stretched film, means the ratio of a linear dimension of a given portion of a stretched film to the linear dimension of the same portion prior to stretching. For example, in a stretched film having an MD stretch ratio ("MDR") of 5:1, a given portion of unstretched film having a 1 cm linear measurement in the machine direction would have 5 cm measurement in the machine direction after stretch. In a stretched film having a TD stretch ratio ("TDR") of 9:1, a given portion of unstretched film having a 1 cm linear measurement in the transverse direction would have 9 cm measurement in the transverse direction after stretch.

"area stretch ratio," means the ratio of the area of a given portion of a stretched film to the area of the same portion prior to stretching. For example, in a biaxially stretched film having an overall area stretch ratio of 50:1, a given 1 cm$^2$ portion of unstretched film would have an area of 50 cm$^2$ after stretching.

Unless context requires otherwise, the terms "orient," "draw," and "stretch" are used interchangeably throughout, as are the terms "oriented," "drawn," and "stretched," and the terms "orienting," "drawing," and "stretching."

BRIEF DESCRIPTION OF THE DRAWING

FIG. 13 is a scanning electron micrograph of a film of the present invention.

FIG. 14 is a scanning electron micrograph of a film of the present invention.

FIG. 19 is a scanning electron micrograph of a film of the present invention.

FIG. 20 is a scanning electron micrograph of a film of the present invention.

DESCRIPTION OF THE PREFERRED EMBODIMENT(S)

A multi-layered biaxially oriented film is provided comprising at least one primary layer and at least one secondary layer, wherein the primary layer comprises a propylene-containing polymer having a first melting point and the secondary layer comprises a propylene-containing polymer having a second melting point, such that the second melting point is greater than the first melting point and the multi-layered construction is biaxially stretched, wherein the stretched film exhibits a crystalline orientation as determined by wide angle X-ray scattering (WAXS) measurements from the monoclinic (110) crystalline planes that is isotropic or exhibits at most a single specific azimuthal scan maximum, said maximum being positioned at an angle of up to ±75° from the machine direction (MD). The single azimuthal scan maximum in addition possesses an angular full width at half peak height (FWHM) between about 40° to 75°.

Figure 1:
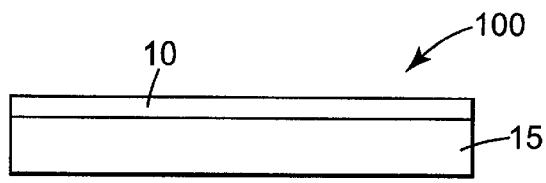
FIG. 1 is an end view of a two layer film construction according to the present invention.

Referring now to FIG. 1, there is shown an end view of a film 100 according to one preferred embodiment of the present invention. Film 100 is biaxially oriented and includes a primary layer 15 and a secondary layer 10. Preferably, film 100 has a thickness in the range of about 0.002 to about 0.006 centimeters.

Preferably, film 100 comprises a multilayer laminate structure having at least two layers, a primary layer 15 and a secondary layer 10, wherein primary layer 15 comprises propylene-containing polymer, and the secondary layer 10 comprise propylene-containing polymers having a melting point higher than the primary layer 15, wherein the film is biaxially stretched so as to provide the desirable properties described herein.

Figure 2:
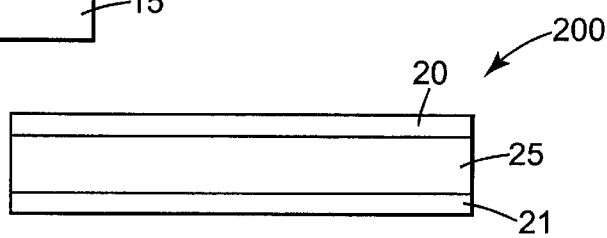
FIG. 2 is an end view of a three layer film construction according to the present invention.

Referring now to FIG. 2, there is shown an end view of a film 200 according to one preferred embodiment of the present invention. Film 200 is biaxially oriented and includes a primary layer 25 and two secondary layers 20, 21, wherein primary layer 25 is between the two secondary layers 20, 21. Secondary layers 20, 21 may be comprises of the same homopolymers or copolymers or they may be different. They may be different in that the copolymer components are the same but in different ratios, or they may be different in that the copolymer components, themselves are different.

Figure 3:
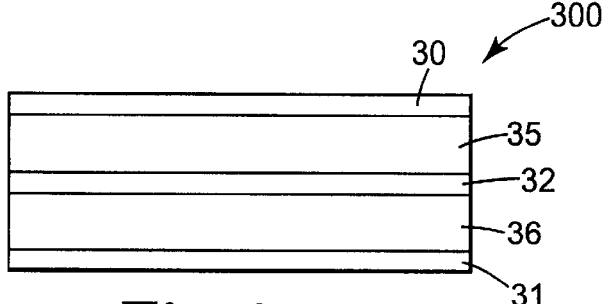
FIG. 3 is an end view of a five layer film construction according to the present invention.

Referring now to FIG. 3, there is shown an end view of a film 300 according to one preferred embodiment of the present invention. Film 300 is biaxially oriented and includes more than one primary layer 35, 36 and more than two secondary layers 30, 31, 32 wherein primary layers 35, 36 are between two of the secondary layers 30, 31. A third layer 32 (although called a secondary layer) may be positioned between two primary layers 35, 36. Note, the nomenclature of "secondary layer" is maintained because the internal layer 32 has the same characteristics and compositions as the actual secondary layers 30, 31. Secondary layers 30, 31, 32 may be comprised of the same homopolymers or copolymers or they may be different. They may be different in that the copolymer components are the same but in different ratios, or they may be different in that the copolymer components, themselves are different. Furthermore, primary layers 35, 36 may be comprised of the same homopolymers or copolymers or they may be different. They may be different in that the copolymer components are the same but in different ratios, or they may be different in that the copolymer components, themselves are different.

Figure 4:
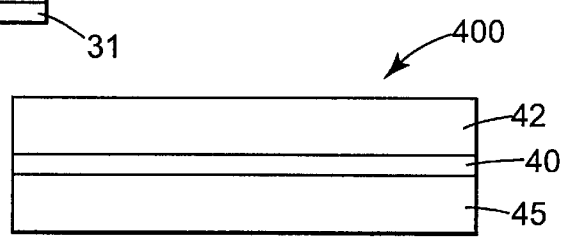
FIG. 4 is an end view of a matte surface three layer film construction according to the present invention.

Referring now to FIG. 4, there is shown an end view of a film 400 according to one preferred embodiment of the present invention. Film 400 is biaxially oriented and includes a primary layer 45, a secondary layer 40 and a surface finishing layer 42, wherein surface finishing layer 42 has a matte surface appearance.

Films having a variety of configurations may be assembled according to the present invention, provided that when the film construction is biaxially stretched, the film exhibits a crystalline orientation as determined by wide angle x-ray scattering (WAXS) measurements from the monoclinic (110) crystalline planes that is isotropic or exhibits at most a single specific azimuthal scan maximum, said maximum being positioned at an angle of up to ±75° from the machine direction (MD), said maximum being positioned at an angle of up to ±75° from the machine direction (MD).

Composition of the Multi-Layers of the Polyolefin Film

The molecular weights of the polymers used in the primary layer, secondary layer, surface finishing layer, as well as any intermediate layer(s) polymers, are chosen so as to optimize processability and adhesion between layers. One particularly notable element of this invention is that relatively high molecular weight polymers can be used to produce finger tearable films and tapes. Generally, the high molecular weight of polymers promotes toughness. In addition, impurities or additives that promote adhesion between the various layers may also be incorporated.

For the purposes of the present invention, the term "polypropylene-ethylene random copolymers" is meant to include copolymers comprising at least about 90% propylene monomer units, by weight. Such copolymers are typically produced by the reactor polymerization of propylene and ethylene feed streams via known loop, slurry or gas-phase polymerization techniques (*Polypropylene Structure, blends and composites*, v. 2, ed. J. Karger-Kocsis, Chapman & Hall, NY (1995)).

The term "isotactic polypropylene" for use as the secondary layer in the present invention is meant to include homopolymer polypropylene having a chain isotacticity index of at least about 80 mol %, preferably greater than 95 mol %, an n-heptane soluble content of less than about 15% by weight, and a density between about 0.86 and 0.92 grams/cm$^3$ measured according to ASTM D1505-96 ("Density of Plastics by the Density-Gradient Technique"). Homopolymer isotactic polypropylenes are typically produced using high yield catalysts and propylene monomer only (*Polypropylene Structure, blends and composites*, v. 1, ed. J. Karger-Kocsis, Chapman & Hall, NY (1995)).

Typical polypropylene and propylene-ethylene random copolymers for use in the present invention have a melt flow rate between about 0.1 and 25 grams/10 minutes, more preferably between about 0.5 and 15 grams/10 minutes, and even more preferably between about 1.0 and 10 grams/10 minutes according to ASTM D1238-95 ("Flow Rates of Thermoplastics by Extrusion Plastometer") at a temperature of 230° C. and force of 2160 g, a weight-average molecular weight between about 100,000 and 900,000 g/mole, and a polydispersity index between about 2 and 15. The resin or resin combinations may include in addition solvent-soluble non-crystallizable polymer content, low molecular weight species, and the like.

Melt flow rate (MFR) are obtained as described in ASTM 1238-95. Commercial producers typically report MFR of their polymers. Another means of characterizing polymers is using intrinsic viscosity (IV). Intrinsic viscosity values for polypropylene or polypropylene copolymers with a high percentage (>95%) of propylene units are typically measured at specified, usually elevated, temperatures in solvents such as tetralin, decalin, or other appropriate solvents. ASTM 446-93 describes suitable viscometers for this measurement. The *"Handbook of Polyolefins: Synthesis and Properties"*, eds Cornelia Vasile and Raymond B. Seymour, Marcel Dekker, Inc. New York, 1993, (pages 140–142) describes determination of IV using the Huggins equation and empirical correlations between IV and viscosity average molecular weight, $M_v$, using the Mark-Houwink-Sakurada equation, all of these relationships well known to those in the art. For reference, $M_w$ is approximately 20% higher than $M_v$ for typical commercial polypropylenes with molecular weight distributions around 5. Results of Moraglio (Chim Ind. (Milan) 41, 879 (1959)), Yamaguchi (Makromol Chem., 128, 19 (1969)), Scholte, et al. (T. G. Scholte, N. L. J. Meijerink, H. M. Schoffeleers, and A. M. G. Brands, J. Appl.

Polym. Sci. 29, 3763–3782, (1984)), Grant and Dieckmann (J. Appl. Polym. Sci 9, 3231–3244, (1965)) and Kinsinger and Hughes (J. Phys. Chem, 63, 2002–2007, (1959)) indicate that IV measured in decalin is about 0.15 units higher than when measured in tetralin.

The Society of Plastic Engineers, in *Polypropylene Fibers—Science and Technology*, M. Ahmed, Elsevier Science Publishing Company, New York, N.Y., p. 26–29 and 159–161, (1982), provides a correlation between IV (in decalin at 135° C.) and MFR for polypropylene: log IV=0.50–0.197 log [MFR].

The polypropylene or propylene-ethylene copolymer resins are not restricted in terms of melt flow properties, as the proper melt flow resin may be chosen suitable for a particular polymer film production process.

Primary Layer

Referring now to the composition of the layers, the primary layer comprises a propylene-containing polymer, including (i) propylene homopolymer or (ii) a blend or mix of two or more propylene-containing polymers or (iii) a blend or mix of propylene-containing polymer with other suitable polymers such that the $MP_{dsc}$ of the main component of the primary layer polymer composition is at least about 2° C. less than the $MP_{dsc}$ of the main component of the secondary layer polymer composition.

Typically, if the melting point of the main component of the primary layer(s) is less than about 2° lower than the main component of the secondary layer polymer melting point, the film of the present invention become more difficult to tear by fingers. Although there is no upper limit to the difference in melting points between the primary layer and secondary layer, in practice the upper limit is what permits the films of the present invention to be biaxially stretched to produce into finger tearable and severable tape backings.

Suitable primary layer polymers include random copolymers of propylene with ethylene, with ethylene contents between about 0.5 to 4.5% being particularly suitable. Polypropylene copolymers with other $C_2$–$C_8$ olefin polymers, as well as blends of several polypropylene copolymers or blends of polypropylene-ethylene copolymers with polypropylene are also suitable. Suitable polymers for this purpose include, but are not limited to, FINA PP 6253 from FINA Oil & Chemical Co., Dallas, Tex. and EXXON PP 9122 from EXXON Chemical Co., Houston, Tex.

Other suitable primary layer polymers include polypropylenes polymerized using metallocene-type catalysts, which in some cases yield polymers having lower melting points than those polymerized using Ziegler-Natta catalyst systems (see for example, U.S. Pat. No. 5,416,228). In the case of metallocene-catalyzed polypropylenes, isotatic polypropylene is preferred.

Optional or minor polymer component(s) may also be included in the primary layer, provided that the optional polymer component or components are present in levels so that desirable film attributes like low puncture energy and low haze are maintained. The optional polymer component (s) may be any suitable polymer, but to obtain desirable low levels of haze, the primary and secondary layers are preferably chosen from polyolefin polymers, copolymers, terpolymers and the like, more preferably from homopolymers or copolymers of polypropylene.

Particularly suitable polypropylene may also include, in an amount so as not to adversely affect the desired characteristics and properties described herein, a resin of synthetic or natural origin having a molecular weight between about 300 and 8000 g/mole, and having a softening point between about 60° C. and 180° C. Typically, such a resin is chosen from one of four main classes: petroleum resins, styrene resins, cyclopentadiene resins, and terpene resins. Optionally, resins from any of these classes may be partially or fully hydrogenated. Petroleum resins typically have, as monomeric constituents, styrene, methylstyrene, vinyltoluene, indene, methylindene, butadiene, isoprene, piperylene, and/or pentylene. Styrene resins typically have, as monomeric constituents, styrene, methylstyrene, vinyltoluene, and/or butadiene. Cyclopentadiene resins typically have, as monomeric constituents, cyclopentadiene and optionally other monomers. Terpene resins typically have, as monomeric constitutents, pinene, alpha-pinene, dipentene, limonene, myrcene, and camphene.

Polymers used in the primary layer are suitable when the starting MFR is from 0.1 to 25 grams per 10 minutes (or when the IV, as measured in decalin or tetralin at 135° C., is from about 1.7 to 5.0), or more preferably when MFR is from 0.5 to 15 grams per 10 minutes (or when IV is from 1.85 to 3.6), or even more preferably when MFR is from 1 to 10 grams per 10 minutes (or when IV is from 2.0 to 3.2).

One suitable polypropylene-ethylene random copolymer for the primary layer has a melt flow rate of 1.5 g/10 minutes, and is commercially available under the product designation 6253 from FINA Oil and Chemical Co., Dallas, Tex. Another suitable polymer resin is a polypropylene-ethylene random copolymer resin having a melt flow rate of 2.1 g/10 minutes, and is commercially available under the product designation Escorene 9122 from EXXON Chemical, Co. Houston, Tex. The polymer resins are not restricted in terms of melt flow properties, as the proper melt flow resin may be chosen suitable for a particular polymer film production process. These MFR values correlate to IV>2.3 (measured at 135° C. in decalin or tetralin).

A preferred weight average molecular weight range for the polymers comprising the primary layer is about 150,000 to 900,000 g/mol.

Secondary Layer

Secondary layer polymers comprise propylene-containing polymers, such as isotactic polypropylene homopolymers or copolymers containing less than about 1% by weight of comonomers such as ethylene, butylene, and the like (such that the 2° C. MP differential is met). Suitable polymers for this purpose include, but are not limited to, FINA PP 3571 isotactic polypropylene available from FINA Oil & Chemical Co., Dallas, Tex.; EXXON PP 4792 available from EXXON Chemical Co. Houston, Tex.; and Aristech FF036Q2 available from Aristech Chemical Co., Pittsburgh, Pa. Suitable polymers include those polymerized using Ziegler-Natta or metallocene catalysts or combinations thereof.

The secondary layer(s) may also comprise a blend of primary layer copolymer with the polypropylene homopolymers or copolymers, provided the melting point of the main component of the secondary layer(s) composition is at least about 2° C. higher than that of the main component of the primary layer.

Suitable secondary layer polymers include isotactic polypropylene or propylene-ethylene copolymers having melting points at least about 2° C. higher than the primary layer polymer composition, as well as blends or mixtures of one or more propylene copolymers and homopolymers. In addition, secondary layer compositions may include blends of isotactic or low ethylene content polypropylene-ethylene random copolymers with polypropylene-ethylene random copolymers having higher ethylene contents, to improve adhesion between adjacent layers.

Polymers used in the secondary layer are suitable when the MFR is from 0.5 to 25 grams per 10 minutes (or when the IV, as measured in decalin or tetralin at 135° C., is from about 1.7 to 3.6).

One suitable propylene copolymer, with ethylene less than 1.0%, for the secondary layer has a melt flow rate of about 3.5 grams/10 minutes, and is commercially available under the product designation FF036Q2 from Aristech Chemical Corp., Pittsburgh, Pa. Another suitable polymer resin for the secondary layer, with ethylene content <1.0% is a polypropylene-ethylene random copolymer resin having a melt flow rate of about 2.5 grams/10 minutes, and is commercially available under the product designation Escorene 4792 from EXXON Chemical. Another suitable polymer resin for the secondary layer, with no ethylene content is a propylene-homopolymer resin having a melt flow rate of about 2.5 g/10 minutes, and is commercially available under the product designation 3374 from FINA Oil and Chemical Co., Dallas, Tex. Another suitable polymer resin is a propylene-homopolymer resin having a melt flow rate of about 9.0 g/10 minutes, and is commercially available under the product designation 3571 from FINA Oil and Chemical Co., Dallas, Tex. The polypropylene resins are not restricted in terms of melt flow properties, as the proper melt flow resin may be chosen suitable for a particular polymer film production process. The suitable resins listed above have MFR values which correlate to IV>2.0.

A preferred weight average molecular weight, $M_w$, range for the polymers comprising the secondary layer is about 100,000 to 800,000 g/mol.

Surface Finishing Layers

Additionally, the film construction may include a surface finishing layer, to impart a matte surface, a writable surface and the like. Such surface finishing layers are comprised of blends or mixtures of incompatible polymers (that is, a blend or mixture that produces a phase separated system). For example, such incompatible polymers typically exhibit high haze, low gloss and matte appearance. Such incompatible polymers include for example, blends of polypropylenes, with low, medium or high density polyethylenes, propylene copolymer or terpolymers and the like. To further improve matte appearance and characteristics such as writability, particulate additions, such as calcium carbonate, titanium dioxide, or silicates may be added to the surface finishing layer compositions. Finally, surface finishing layer compositions may comprise other polymer types like polystyrene, impact modified polystyrene, polyesters, polycarbonates, polyamides and the like. These classes of polymers may confer specific properties to the overall film construction as for example, decreased puncture energy, improved matte appearance, barrier properties and the like.

Typical surface finishing layer compositions include but are not limited to propylene-containing polymers such as, isotactic polypropylenes or propylene-ethylene random copolymers have a melt flow rate of greater than or equal to 30 grams/10 minutes, more preferably greater than or equal to 50 grams/10 minutes, and even more preferably greater than or equal to 75 grams/10 minutes according to ASTM D1238-95 ("Flow Rates of Thermoplastics by Extrusion Plastometer") at a temperature of 230° C. and force of 2160 grams. The melting point of the propylene-containing polymer is between 140° and 165° C.

The selection of the propylene-containing polymer is typically made based upon the orientation temperature of the primary layer. For the present invention, the melting point of the propylene-containing polymer of the surface finishing layer is at least 2° C. lower than the orientation temperature of the primary layer. The melting point of the propylene-containing polymer of the surface finishing layer is measured using differential scanning calorimetry (DSC) as described herein.

Suitable propylene-containing polymers include random copolymers of propylene with ethylene, with ethylene contents between about 0.5 to 4.5% being particularly suitable. Propylene copolymers with other $C_2$–$C_8$ alpha-olefin polymers, as well as blends of several polypropylene copolymers or blends of polypropylene-ethylene copolymers with polypropylene are also suitable. Suitable polymers for this purpose include, but are not limited to, FINA PP 3860 and FINA 7825 from FINA Oil & Chemical Co., Dallas, Tex.

Typical high-density polyethylenes used in the surface finishing layer of the present invention have a melt flow rate of less than or equal to 1 gram/10 minutes, more preferably less than 0.5 grams/10 minutes, and even more preferably less than 0.25 grams/10 minutes according to ASTM D1238-95 ("Flow Rates of Thermoplastics by Extrusion Plastometer") at a temperature of 230° C. and force of 2160 grams. The density of the high-density polyethylene used in the present invention is between about 0.92 and 0.97 grams/$cm^3$ measured according to ASTM D15050-96 ("Density of Plastics by the Density-Gradiant Technique"). The melting point of the high-density polyethylene is between 120° and 150° C., preferably between about 125° and 135° C.

Suitable high-density polyethylenes include polyethylene homopolymers and ethylene copolymers with other $C_2$–$C_8$ alpha-olefin polymers, as well as blends of several polyethylene copolymers or blends polyethylene copolymers with polyethylene. One suitable resin for use in the surface finishing layer is a high-density linear copolymer, commercially available under the product designation HiD® 9640 from Chevron Chemical Co., Houston Tex.

According to the invention, the ratio of the melt flow rate of the high density polyethylene (measured at 230° C. and load of 2160 grams) to the melt flow rate of the propylene-containing copolymer (measured at 230° C. and load of 2160 grams) of the surface finishing layer should be at least 1:30, preferably 0.2:30, and more preferably 0.2:100 in order to create a low gloss matte surface with a superior appearance. It has been found that large difference in melt flow rate of the high-density polyethylene and propylene-containing copolymer result in a superior matte appearance with low gloss and a matte surface significantly free of voids or cracks, providing the film is oriented at temperatures at least 2° C. higher than the melting point of the propylene-containing polymer of the surface finishing layer.

Suitable particulate fillers used in the matte layer blend of the present invention include calcium carbonate, silica, titanium dioxide, and the like. According to the invention, the Mohs hardness of the particulate should be greater than 2. It is preferred that the average diameter of the particulate filler is no greater than 5 $\mu$m, preferably no greater than 3.5 $\mu$m and that the maximum particulate diameter is no greater than 15 $\mu$m. The particulate filler should be adequately mixed in the surface finishing layer such that there are no large agglomerates of particulate filler. One suitable particulate filler for use in the matte layer blend is commercially available under the product designation HiPflex® 100 from Specialty Minerals, Bethlehem, Pa.

In a preferred embodiment of the present invention, the surface finishing layer comprises a blend of 20 to 80% by weight high-density polyethylene and 80–20% by weight isotactic polypropylene or propylene-ethylene random copolymer, more preferably 40–60% by weight high-density polyethylene and 60–40% by weight isotactic polypropylene or propylene-ethylene random copolymer. To the blend of high-density polyethylene and isotactic polypropylene or propylene-ethylene random copolymer, 5–30% by weight of particulate filler, preferably 10–20% by weight of particulate filler, is added to the blend in order to make a surface that can be written on with pencil, ball point pen, and permanent marker.

According to one preferred embodiment invention, after biaxial orientation, the thickness of the entire film construction is 25–50 μm and the thickness of the matte layer is 2–7 μm, more preferably 3–5 μm.

The film of the invention has the desired optical appearance such that it has a superior matte appearance. For the purpose of the present invention, "matte appearance" is defined as a having low surface gloss and high haze. "Low surface gloss" is defined as values of gloss less than or equal to 10% as measured by ASTM D2457-97 ("Specular Gloss of Plastic Films and Solid Plastics") at an angle of incidence of 60°. "High haze" is defined as values of haze greater than 70% and less than 90% as measured by ASTM D1003 ("Haze and Luminous Transmittance of Transparent Plastics"). "Total percent light transmittance" of the film is greater than 90% as measured by ASTM D1003 ("Haze and Luminous Transmittance of Transparent Plastics").

In addition, this invention provides a film that has a surface that can be written on with pencil, ballpoint pen, and permanent marker. To obtain such writability, the particulate filler typically has a Mohs hardness of greater than 2 such that when writing on the surface of the film, pencil lead can be abraded, producing a solid line.

Additives and other components as is known in the art may be included in the polypropylene compositions. For example, the films of the present invention may contain fillers, pigments and other colorants, antiblocking agents, lubricants, plasticizers, processing aids, nucleating or clarifying agents, antistatic agents, tackifying resins, antioxidants and heat stabilizing agents, ultraviolet-light stabilizing agents, and other property modifiers. Typically, such materials are added to a polymer before it is made into an oriented film (e.g., in the polymer melt before extrusion into a film). Such additions and other components are added in effective amounts as may be known to those skilled in the art.

Intermediate Layers

Figure 5:
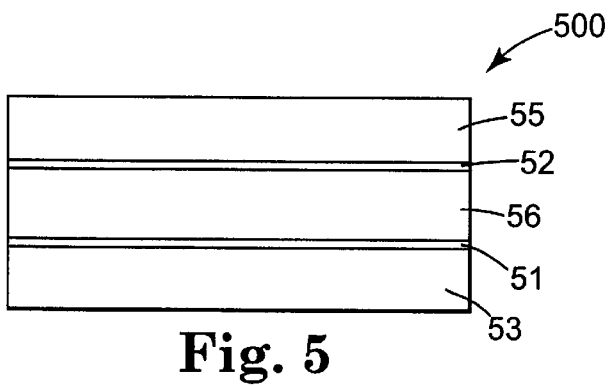
FIG. 5 is an end view of a three layer film construction according to the present invention further including a tie layer between the primary layer and the secondary layers.

Referring now to FIG. 5, there may or may not be an intermediate layer(s) 51, 52 that are between the various layers 53, 55, 56. Typically, an intermediate layer (51 or 52) would be used to improve layer adhesion or film processability, such as to "bind" a secondary layer 53 to a primary layer 56, or the primary layer 56 to a surface finishing layer 55. Such intermediate layers are typically referred to as a "tie layer" and any number of tie layers can be used in any combination with the primary, secondary and surface finishing layers. This may be accomplished by using a polymer composition that is compatible with both layers or may be a layer comprised of some polymers from both layers, thus providing good adhesion and stable melt processability.

Intermediate layers, if desired, can be composed predominantly of either the primary layer or secondary layer polymer, or may be a blend of the two or contain additional components so as to optimize processability and film properties. The combined secondary layer(s) and intermediate layer(s) thickness may be between about 5% to about 50% of the total film thickness. Furthermore, secondary layer compositions must be sufficiently thermally stable to resist melting during subsequent processing, such as coating.

Film Processing—Extrusion/Casting

The multilayer construction of the present invention can be melt coextruded and cast into sheet form by apparatus known to those of skill in the art. Such cast films are then stretched to arrive at the preferred film described herein. When making films according to the present invention, a suitable method for casting a multilayer sheet is to feed the resins into the feed hopper of a single screw, twin screw, or other extruder system having an extruder barrel temperature adjusted to produce a stable homogeneous melt. The melt can be coextruded through a multilayer or manifold/feedblock type sheet die onto a rotating cooled metal casting wheel. Optionally, the casting wheel can be partially immersed in a fluid-filled cooling bath, or, also optionally, the cast sheet can be passed through a fluid-filled cooling bath after removal from the casting wheel. The temperatures of this operation can be chosen by those of skill in the art with the benefit of the teachings herein to provide the desired nucleation density, size, growth rate and interlayer adhesion such that the resulting stretched film has the desired characteristics and properties described herein. Typical casting wheel temperatures, as well as water bath temperatures, are below about 60° C., preferably below about 40° C., to provide a suitably crystallized sheet.

Film Processing—Stretching/Orienting

Any suitable apparatus for biaxially stretching the films according to the preferred methods described herein may obtain the preferred properties described herein. Of all stretching methods, the apparatus preferred for commercial manufacture of films for tape backings include: sequential biaxial stretching apparatus that typically stretches in the MD first by passing the film over a sequence of rotating rollers whose speed provides a higher output film line speed than input speed, followed by TD stretching in a tenter on diverging rails; simultaneous biaxial stretching by mechanical tenter such as the apparatus disclosed in U.S. Pat. Nos. 4,330,499 and 4,595,738; and the tenter apparatus for simultaneous biaxial stretch disclosed in U.S. Pat. Nos. 4,675,582; 4,825,111; 4,853,602; 5,036,262; 5,051,225; and 5,072,493. Although biaxially stretched films can be made by tubular blown film or bubble film making processes, it is preferable that the films of this invention, when used as tape backings, be made by a flat film stretching apparatus to avoid processing difficulties such as non-uniform thickness and stretching, and inadequate temperature control that may arise with tubular blown film processes.

The extent and type or directionality of orientation in part governs a stretched film's mechanical properties, particularly in regard to loads applied in specific directions. The oriented structural state correlates well with observed mechanical properties (R. J. Samuels, *"Structured Polymer Properties,"* Ch. 5, John Wiley & Sons, N.Y., and A. J. DeVries, *Polymer Engineering & Science,* 23(5), 241 (1983)).

The temperatures of the stretching operation can be chosen by those of skill in the art with the benefit of the teachings herein to provide a film having the desired characteristics and properties described herein. These temperatures will vary with the material used, and with the heat transfer characteristics of the particular apparatus used. For simultaneously stretched backings, it is preferred that preheating and stretching occur in the range from approximately 130° C. to 200° C.

Molecular Orientation

There are several widely accepted means by which to measure molecular orientation in oriented polymer systems, among them scattering of light or X-ray, absorbence measurements, mechanical property analysis, and the like. Quantitative methods include wide angle X-ray scattering ("WAXS"), optical birefringence, infrared dichroism, and small angle X-ray scattering ("SAXS"). A preferred method to determine the crystalline chain axis orientation distribution is the WAXS technique, in which crystalline planes within the fibrillar structures scatter or diffract incident X-ray beams at an established angle, known as the Bragg angle (see A. W. Wilchinsky, *Journal of Applied Physics*, 31(11), 1969 (1960) and W. B. Lee et al., *Journal of Materials Engineering and Performance*, 5(5), 637 (1996)). In WAXS, a crystalline plane, for example the monoclinic (110) plane of isotactic polypropylene containing information about the polypropylene molecular chain (or c-) axis is measured and then related by sample geometry to external co-ordinates.

The inventive films preferably have a specific, single crystalline morphology orientation with respect to either the MD or a reference direction "R".

Referring specifically to FIGS. 7a to 10b, FIGS. 7a, 8a, 9a, and 10a are representations of the orientation condition in stretched films. The specific order and orientation are set forth below. FIGS. 7b, 8b, 9b and 10b are graphical representation of WAXS results at various values of the stretched films shown in FIGS. 7a, 8a, 9a, and 10a, respectively.

The "reference direction" as used herein, is the axis lying in the plane of the film against which the crystalline orientation is defined. When determining the mechanical properties of a film, the reference direction is the direction in which the film is stretched. When determining the energy to puncture a film, the reference direction is the direction in which the film is tensioned prior to being subjected to puncture testing described herein. For backing films converted into adhesive tape in roll form, the reference direction is the direction in which the stock roll is slit into narrow width to be wound into tape rolls. Typically, though not always, the reference direction is the same as the longitudinal or machine direction (MD) of the film.

Figure 8A:
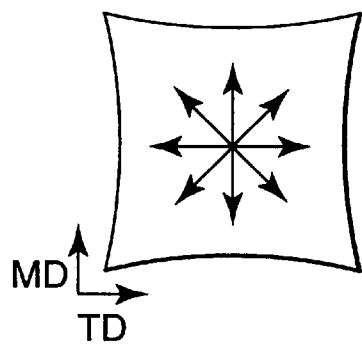
FIG. 8a is representation of a simultaneously stretched film.
Figure 8B:
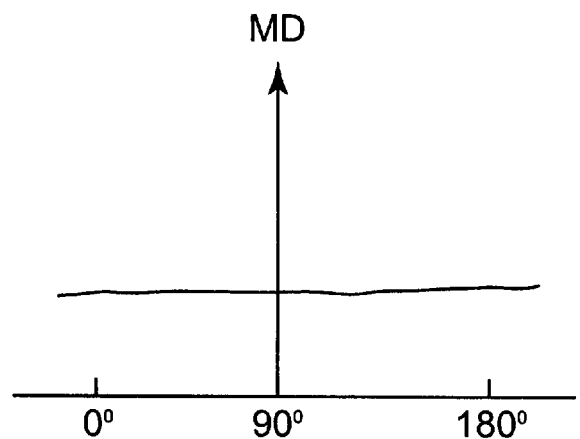
FIG. 8b is a graphical representation of WAXS results when $\Delta_n = 0$.
Figure 9A:
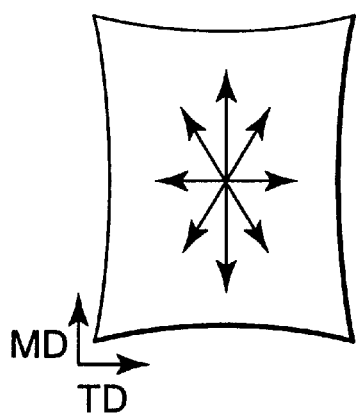
FIG. 9a is representation of a MD biased simultaneously stretched film.
Figure 9B:
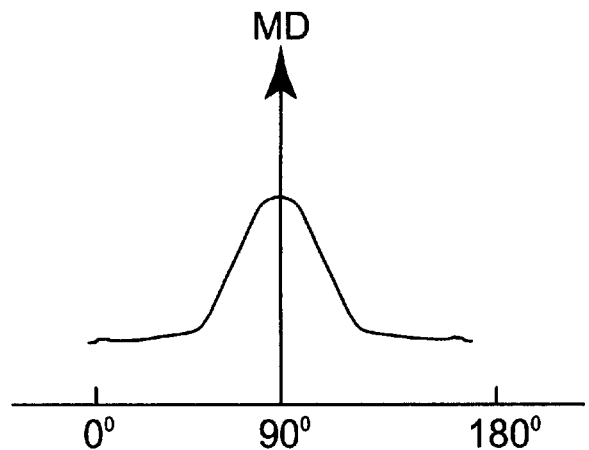
FIG. 9b is a graphical representation of WAXS results when $\Delta_n > 0$.

A particularly useful characteristic of the inventive films is that they exhibit a crystalline orientation as determined by wide angle X-ray scattering measurements from the monoclinic (110) crystalline planes that is isotropic or has a single azimuthal scan maximum, said single azimuthal scan maximum being positioned at an angle of up to ±75° relative to a reference direction. The diffraction patterns referred to are those detected by examination of one quadrant of a typical WAXS diffraction pattern, for example the azimuthal angular range from 90° to 180°. Although the FIGS. 7b to 10b depict the diffraction pattern between the angles of 0° and 180°, it is the case that the region from 0° to 90° is a mirror image of that from 90° to 180°. The choice of depicting date from 0° to 180° is made to allow diffraction patterns centered about 90° angles, that is, the MD to be more clearly descerned. The single azimuthal scan maximum in addition possesses an angular full width at half peak height between about 40° to 75°, as shown in FIGS. 9a and 9b. If the inventive films possess an isotropic crystalline orientation distribution, then the WAXS azimuthal scan does not exhibit a distinct maximum, as shown in FIGS. 8a and 8b. In this case the crystalline chain axis orientation is evenly distributed in the plane of the film.

Figure 7A:
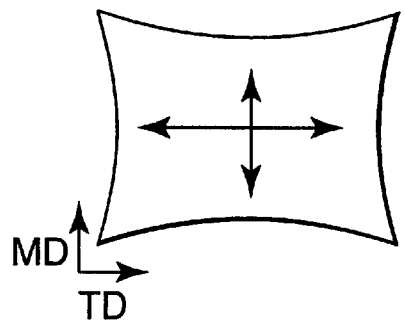
FIG. 7a is representation of a sequentially stretched film.
Figure 7B:
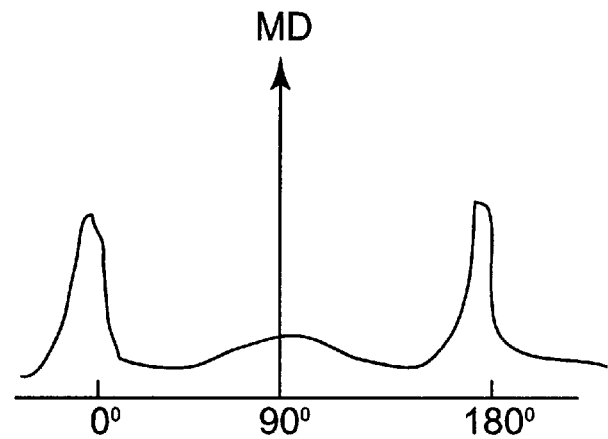
FIG. 7b is a graphical representation of WAXS results when $\Delta_n < -3.0 \times 10^{-3}$.

By contrast, the occurrence of two or more WAXS azimuthal scan maxima, as shown in FIG. 7b, at least one of which is positioned at an angle of greater than about ±75° relative to said reference direction or a single, specific WAXS azimuthal scan maximum which is positioned at an angle of greater than about ±75° relative to said reference direction, is characteristic of an undesirably oriented film. If the peak or peaks in addition possess a full width at half peak maximum (FWHM) of less than about 40°, the film characterized thereby is particularly unsuitable for the purposes of the present invention. In this case the film is typically too stretchy and results in tape rolls that tend to telescope or gap, and tape that tends to stretch, deform and stress whiten when severed on the blade of commercially available adhesive tape dispensers. In addition, such films are found to be difficult or impossible to tear using the fingers.

Another preferred method to determine the orientation of a film, or direction in which the overall polymer system has been most highly oriented, is to measure the refractive index of the film, as described in ASTM D 542-95. The refractive index represents the slowing or optical retardation of an electromagnetic wave through a material because of the interaction of the wave with polarizable molecules in the material (*Encyclopedia of Polymer Science and Engineering*, v. 14, John Wiley & Sons, NY (1987)). For polyolefins including polypropylene and polyethylene, the refractive index is highest along the backbone direction because the electron mobility or polarizability is greatest parallel to backbone chemical bonds. For polypropylene film, the refractive index measured parallel to the principal orientation direction is greater than that measured perpendicular to this direction. This is called positive birefringence. In such a case, the film has a greater orientation parallel than perpendicular to an orientation direction. For the purposes of the present invention, the refractive indices are measured in the MD and TD directions of the film.

Figure 10A:
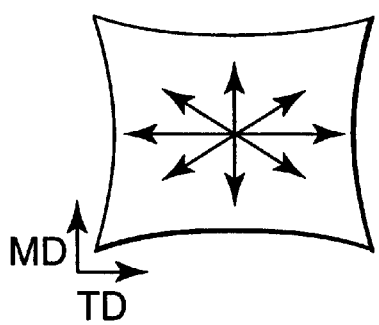
FIG. 10a is representation of a TD biased simultaneously stretched film.
Figure 10B:
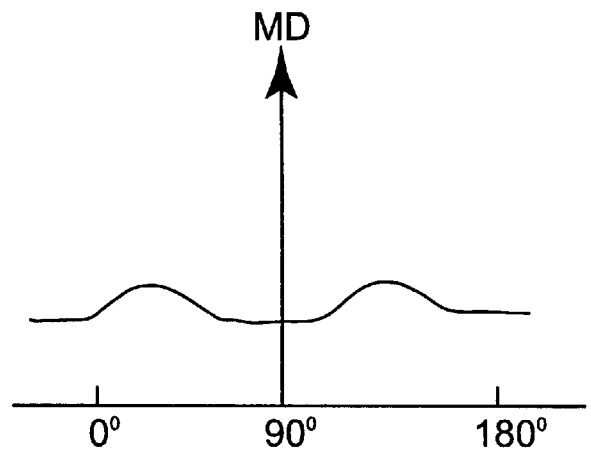
FIG. 10b is a graphical representation of WAXS results when $\Delta_n > -3.0 \times 10^{-3}$.

If the refractive index in the MD is lower than in the TD, and the film exhibits either an isotropic WAXS azimuthal scan or a specific, single WAXS azimuthal scan maximum positioned up to about ±75° with respect to the reference direction, here taken to be the MD, the resulting film may still be useful in the present invention so long as the specific application property requirements are met. The orientation representation and WAXS depiction for this case are shown in FIGS. 10a and 10b. If, however, the refractive index in the MD is lower than in the TD, and the film exhibits either more than one WAXS azimuthal scan maxima, one at least of which is positioned greater than ±75° to the reference direction, or a specific single WAXS azimuthal scan maximum positioned at an angle greater than ±75° to the reference direction, then as described above the resulting film is found to be unsuitable for the purposes of the present invention.

"Biaxially stretched," when used herein to describe a film, means that the film has been stretched in two different directions in the plane of the film. Typically, but not always, the two directions are perpendicular. Biaxially stretched films are oriented and may be sequentially stretched, simultaneously stretched, or stretched by some combination of simultaneous and sequential stretching. "Simultaneously biaxially stretched," when used herein to describe a film, means that significant portions of the stretching in each of the two directions are performed simultaneously. A "single maximum" when used to describe the WAXS azimuthal scan of the inventive films disclosed herein will be identifiable as a single inflection observed from a WAXS transmission azimuthal scan, exhibiting symmetry within the 360° angular range probed by the X-ray scans due to the diffractometer geometry and the crystal physics of the monoclinic isotactic polypropylene. Such a single maximum is distinguishable from noise in the data and the scattered intensity due to portions of the polymer matrix possessing random orientation, that will typically have a magnitude of less than 1% of the maximum value.

In one preferred embodiment, the biaxial area stretch ratio is above about 30:1, more preferably from about 36:1 to 90:1, and most preferably about 45:1 to 90:1. The upper limit for area stretch ratio is the practical limit at which the film can no longer be stretched on commercial available apparatus at sufficiently high speeds. Preferably, the MD stretch ratio is above about 4:1, more preferably from about 4:1 to 8.5:1, still more preferably from about 5:1 to 8:5:1, and most preferably from about 6.0:1 to 8.5:1. The MD component and TD component of these embodiments is chosen so as to provide the desired film properties and characteristics described herein. If the orientation of the films of this invention are below the stated ranges, the film tends to be understretched, that is, exhibit elongation to puncture values greater than 1.3 cm, which leads to excessive elongation during severing or hand tearing leading to distorted severed edges and stress whitening. In addition, inadequate stretching leads to localized necking and non-uniformity of thickness and physical properties across the sheet, both of which are highly undesirable from the standpoint of adhesive tape manufacturing.

In one preferred embodiment, the machine direction stretch ratio is at about the same as or greater than the transverse direction stretch ratio, to provide adhesive tape backing film with low puncture resistance and limited elongation to break in the machine direction. Such tapes avoid stretching and distortion during severing on the teeth of commercially available tape dispensers to produce cleanly serrated edges.

The properties and characteristics are described herein with respect to the preferred embodiments, and reported herein with respect to the examples, for films without adhesive compositions coated thereon. It is expected that in most cases, the characteristics and properties of the article are governed primarily by the backing, with little affect by the adhesive or other layers or coatings. Therefore, the above preferred characteristics and properties also apply to the adhesive tapes of the present invention.

Mechanically, severability (dispensing characteristics) can be considered as the loading to break of the tape backing as it is pulled over the teeth of a commercial adhesive tape dispenser. Similarly, the ability to tear an adhesive tape by hand can be considered as the loading to break of the backing as it is pulled between the fingers. In either case, both the energy to break and the tensile elongation to break are used to evaluate the suitability of a particular tape backing for use. The resistance to break can be evaluated in a tensile test or by means of a puncture test, in which the tape backing is held fixed in a clamp and a test probe is driven through the tape backing until the tape breaks. It is desirable to obtain a biaxially oriented multilayer polyolefin based tape or tape backing which has sufficiently low tensile strength and low puncture resistance so as to be severable and tearable by hand.

For multilayer biaxially oriented polymer films, the primary physical properties that relate to severability or tearability are the difference in crystallinity between the primary and secondary polymer layer(s), overall orientation and directionality of the orientation. These physical properties in turn govern the film mechanical properties such as strength, toughness, tensile elongation to break and puncture resistance. It is desired that severable and hand tearable adhesive tapes display a combination of characteristics, particularly low puncture resistance, low tear resistance, low elongation to puncture failure and low tensile strength in the longitudinal tape or machine direction.

In the case of the present invention, films with high puncture or tear resistance are unsuitable for use as severable adhesive tape backings in that this toughness is counter to the desired severability characteristics for a tape backing film. In addition, adhesive tape backings must be dimensionally stable and heat and shrink resistant in order to be processable during coating and drying operations, and to produce stable, uniform rolls of adhesive tape that do not exhibit telescoping or gapping which are known to be caused by longitudinal shrinkage or thermal instability. Moreover, the combination of low puncture resistance and dimensional stability are particularly desirable properties for an adhesive tape backing.

Adhesive Coated Tapes

The films of the present invention are particularly useful as a backing for an adhesive coated tape, preferably having a final thickness between about 0.002–0.006 cm. Variability in film thickness is preferably less than about 5%. Thicker and thinner films may be used, with the understanding that the film should be thick enough to avoid excessive flimsiness and difficulty in handling, while not being so thick so as to be undesirably rigid or stiff and difficult to handle or use.

Figure 6:
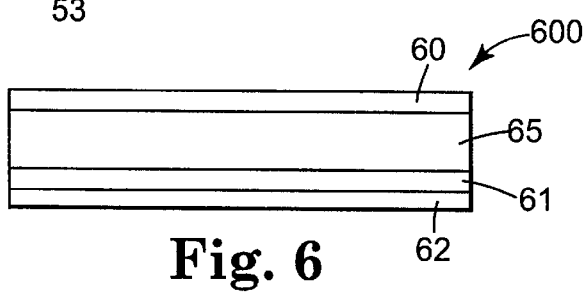
FIG. 6 is an end view of a three layer film construction according to the present invention further including an adhesive layer.

The films of the present invention are particularly useful in the construction of adhesive coated tapes, such as those sold by 3M under the tradename of Scotch™ Magic™ Tape or Scotch™ Satin™ Tape. Referring particularly to FIG. 6, an end view of such three layer film construction according to the present invention further including an adhesive layer is shown. Using the films 600 of the present invention as a backing or substrate, an adhesive composition 62 is coated onto a first major surface of the backing and may be any suitable adhesives as is known in the art. Preferred adhesive compositions are those activatable by pressure, heat or combinations thereof. Film 600 is biaxially oriented and includes a primary layer 65 and two secondary layers 60, 61, wherein primary layer 65 is between the two secondary layers 60, 61. Secondary layers 60, 61 may be comprised of the same homopolymers or copolymers or they may be different. They may be different in that the components are the same but in different ratios (if more than one component), or they may be different in that the components, themselves are different.

Suitable adhesive compositions for adhesive layer 62 include but are not limited to those based on acrylate, rubber resin, epoxies, urethanes or combinations thereof. The adhesive compositions may be applied by solution, water-based or hot-melt coating methods and may include hot melt-coated formulations, transfer-coated formulations, solvent-coated formulations, and latex formulations, as well as laminating, thermally-activated, and water-activated adhesive compositions.

The backings described herein are well-suited for many adhesive tape backing applications, including utility tapes, light duty tapes, and sealing and mending tapes. Because the backing is conformable, it is also useful as a masking tape backing.

Adhesive Layers

Particularly useful adhesives useful in the present invention include all pressure sensitive adhesives. Pressure sensitive adhesives are well known to possess properties including: aggressive and permanent tack, adherence with no more than finger pressure, and sufficient ability to hold onto an adherend.

Examples of adhesives useful in the invention include those based on general compositions of polyacrylate; polyvinyl ether; diene rubber such as natural rubber, polyisoprene, and polybutadiene; polyisobutylene; polychloroprene; butyl rubber; butadiene-acrylonitrile polymer;

thermoplastic elastomer; block copolymers such as styrene-isoprene and styrene-isoprene-styrene (SIS) block copolymers, ethylene-propylene-diene polymers, and styrene-butadiene polymers; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures or blends (continuous or discontinuous phases) of the above.

Additionally, the adhesive compositions may contain additives such as tackifiers, plasticizers, fillers, antioxidants, stabilizers, pigments, diffusing materials, curatives, fibers, filaments, and solvents.

A general description of useful pressure sensitive adhesives may be found in Encyclopedia of Polymer Science and Engineering, Vol. 13, Wiley-Interscience Publishers (New York, 1988). Additional description of useful pressure sensitive adhesives may be found in Encyclopedia of Polymer Science and Technology, Vol. 1, Interscience Publishers (New York, 1964).

To improve adhesion of coating layers, such as a layer of an adhesive composition, the invention films may be optionally treated by exposure to flame or corona discharge or other surface treatments including chemical priming. In addition, any tape constructions could include additional coatings, such as for example an optional low adhesion backsize materials to prevent restrict blocking, thereby allowing for production of adhesive tape rolls capable of easy unwinding, as is well known in the adhesive coated tape-making art.

The operation of the present invention will be further described with regard to the following detailed examples. These examples are offered to further illustrate the various specific and preferred embodiments and techniques. It should be understood, however, that many variations and modifications might be made while remaining within the scope of the present invention.

Test Methods
Film Tensile Property Determinations

The machine direction (MD) tensile strength-at-break was measured according to the procedures described in ASTM D882-97, "Tensile Properties of Thin Plastic Sheeting," Method A. The films were conditioned for 24 hours at 22° C. (72° F.) and 50 percent relative humidity (RH) prior to testing. The tests were performed using a tensile testing machine commercially available as a Model No. Sintech 200/S from MTS Systems Corporation, Eden Prairie, Minn. Specimens for this test were 2.54 cm wide and 15 cm long. An initial jaw separation of 10.2 cm and a crosshead speed of 25.4 cm/min were used. Six specimens were tested for each sample in the MD.

Puncture-Energy Determination

The puncture energy and elongation to puncture were determined using a method based on ASTM F 1306-94 with the changes as detailed below: A Model No. Sintech 200/S tensile testing machine manufactured by MTS Systems Corporation, Eden Prairie, Minn. was used for the testing. The specimen clamping fixture described in ASTM F 1306-94 was modified to comprise two rigid plates having a 7.62-cm diameter square opening in the center of each plate. The penetration probe described in ASTM F 1306-94 was replaced with a 0.318 cm diameter cylindrical steel rod having a hemispherical tip. Displacement of the plunger assembly was measured during loading and complete penetration of each test specimen. Specimens for testing were cut parallel to the MD into 2.54 cm wide strips or in 1.27 cm wide strips, as reported below. Specimens were 12.7 cm in length to be adequately gripped in the clamp assembly. Each test was performed at a speed of 254 cm/min. At least six specimens were tested for each determination. The films were conditioned for 24 hours at 22° C. (72° F.) and 50 percent relative humidity (RH) prior to testing.

For each test, the specimen was clamped into the assembly. Each specimen was centered across the plate opening. A piece of pressure-sensitive adhesive tape was used to hold the sample onto one side of the bottom plate of the clamp assembly while a weight (75 g) was hung on the other side of the specimen so as to ensure that the sample was loaded under constant tension. The clamping plate was then tightened using thumb screws so that the sample did not slip during the test. The clamp assembly was positioned under the plunger so that the path of the plunger was through the center of the sample. The total energy required to puncture the sample as well as elongation to puncture was determined.

As used herein, including the claims, the term "Puncture Test-2.54 cm" refers to the just-described test as performed on 2.54 cm wide samples, and the term "Puncture Test-1.27 cm" refers to the just-described test as performed on 1.27 cm wide samples.

It has been determined that a correlation exists between puncture test results obtained for 2.54 cm wide samples and test results obtained for 1.27 cm wide samples. That is, test results obtained for 1.27 cm wide samples is about 3.25–3.5 times higher in value than for the same film types measured at 2.54 cm sample width.

Wide Angle X-Ray Scattering (WAXS) Measurements

Wide angle X-ray Diffraction data (WAXS) were collected by use of a Picker 4-circle diffractometer, copper $K\alpha$ radiation, and scintillation detector registry of the scattered radiation. The diffractometer was fitted with fixed entrance slits and a fixed receiving slit. Transmission data collection geometry was employed with the effective reference direction axis oriented vertically and coincident with the diffractometer $2\theta$ axis. The X-ray generator was operated at settings of 40 kV and 25 mA. Specimens were mounted on aluminum holders using double coated adhesive tape with no backing plate or support used under the portion of the film exposed to the incident X-ray beam.

Polypropylene peak positions were located from survey step scans conducted from 5 to 35 degrees ($2\theta$) using a 0.05 degree step size and 30 second count time. Azimuthal step scans of the polypropylene monoclinic (110) maximum were conducted from instrument settings of –180 to +180 degrees (X) using a three degree step size and 10 minute count time. The resulting scattering data were reduced to x-y pairs of azimuthal angle and intensity values and subjected to profile fitting using the data analysis software ORIGIN™ (ORIGIN™ version 4.1 available from Microcal Software Inc., One Roadhouse Plaza, Northhampton, Mass. 01060). A Gaussian shape model was employed to describe observed intensity maxima in the azimuthal scans. Widths measured in the profile filling procedures described above were taken as the full width at half maximum (FWHM) above a linear background model. The results of the WAXS are presented in Table 1.

Index of Refraction Test Method

The refractive index of film samples was measured according to ASTM D 542-95 in directions parallel and perpendicular to the reference direction, typically taken to be the machine direction (MD). A Metricon Model 2010 Prism Coupler, available from Metricon Corporation of Pennington N.J., USA, was used to measure the refractive index. This model was equipped with a 200-P-1 type prism and a low power (0.5 mw nominal) He—Ne laser (632.8 nm), CDRH/BRH Class II light source. The refractive index range for this system is less than 1.80.

Specimens 1.3 cm by 3.8 cm in size were cut from the film sample to be measured, with the specimen loaded in the sample chamber such that the reference direction was oriented vertically with respect to the light source. The specimen was contacted to the base of a prism by means of a pneumatically-operated coupling head, and scanned by means of a laser beam reflecting from the prism base onto a photodetector. At certain discrete values of the incident angle (mode angles) a sharp drop in the intensity of light reaching the photodetector occurred. The angular location of the first mode then determines the film refractive index.

Similarly, the refractive index was determined after rotating the sample by 90° (that is, perpendicular) so that the reference direction was oriented horizontally. The refractive index was then measured in this direction, noted as the perpendicular to the reference or transverse direction.

Haze Test Method

The haze of example film constructions was measured according to ASTM D1003-97. The hazemeter used in the measurement was a Haze-gard plus, Cat. No. 4725 available from BYK-Gardner USA of Columbia, Md. Sample specimens 15 cm by 15 cm in size were cut from film sheets so that no oil, dirt, dust or fingerprints were present in the section to be measured. The specimens were then mounted by hand across the haze port of the hazemeter and the measurement activated. 10 replicate haze measurements were taken, and the average of these 10 measurements reported as the haze value herein.

Melting Point Determination

The melting points of resin samples were determined according to ASTM E794-98, using a DuPont Model 2100 Differential Scanning Calorimeter (DSC) with a heating rate of 10° C./min through the temperature range from 25° to 200° C. Approximately 5 mg of resin sample were loaded into metal DSC pans, crimped, and set into the test chamber. Samples were first heated under positive nitrogen pressure at 10° C./min from 25° to 200° C., held at 200° C. for 3 minutes, cooled at 10° C./min to 25° C., then re-scanned in order to ensure good contact between the sample and the DSC pan, the endothermic peak of the second scan was taken as the melting point of the polymer samples. Values are reported in Table 1.

The operation of the present invention will be further described with regard to the following detailed examples. These examples are offered to further illustrate the various specific and preferred embodiments and techniques. As the examples illustrate, the desired properties of the film are obtained by stretching the film in a way to obtain the preferred morphology of films described herein, rather than defining the film by describing nominal machine draw ratios as has been commonly taught in the art. It should be understood, however, that many variations and modifications might be made while remaining within the scope of the present invention.

Optical Microscopy of Severed Film Edges

Figure 11:
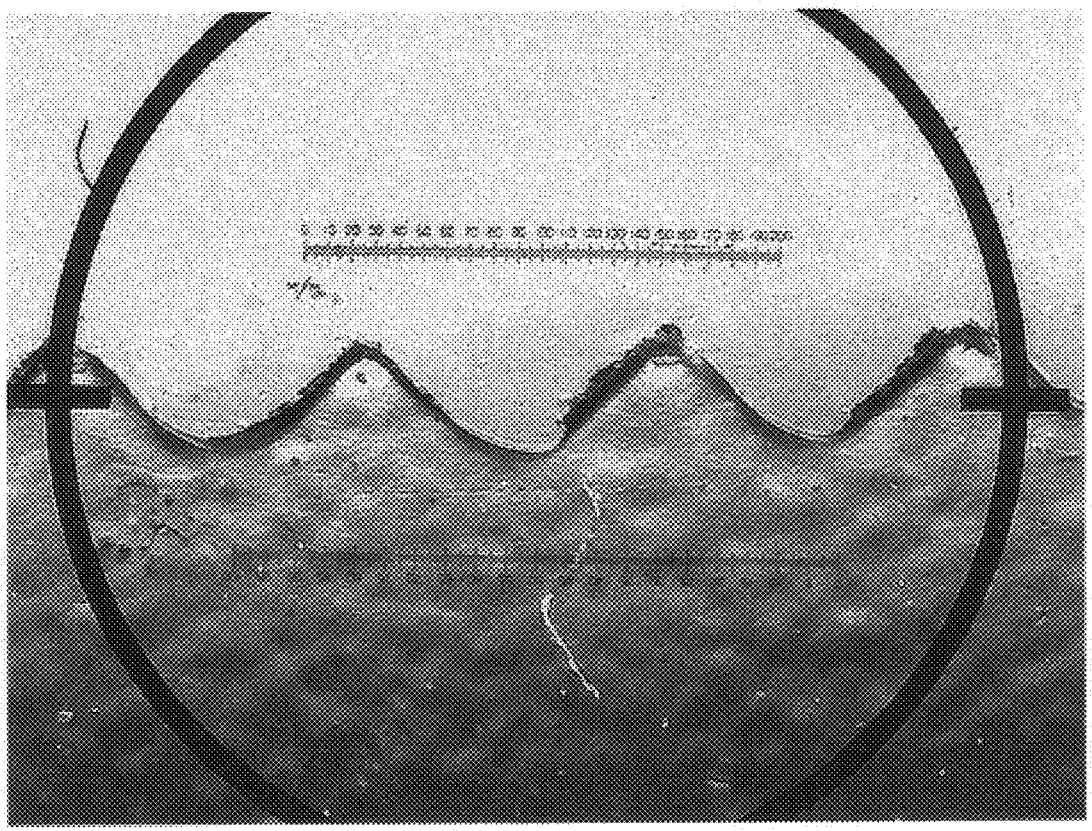
FIG. 11 is a microphotograph of a severed edge of a film of the present invention.
Figure 12:
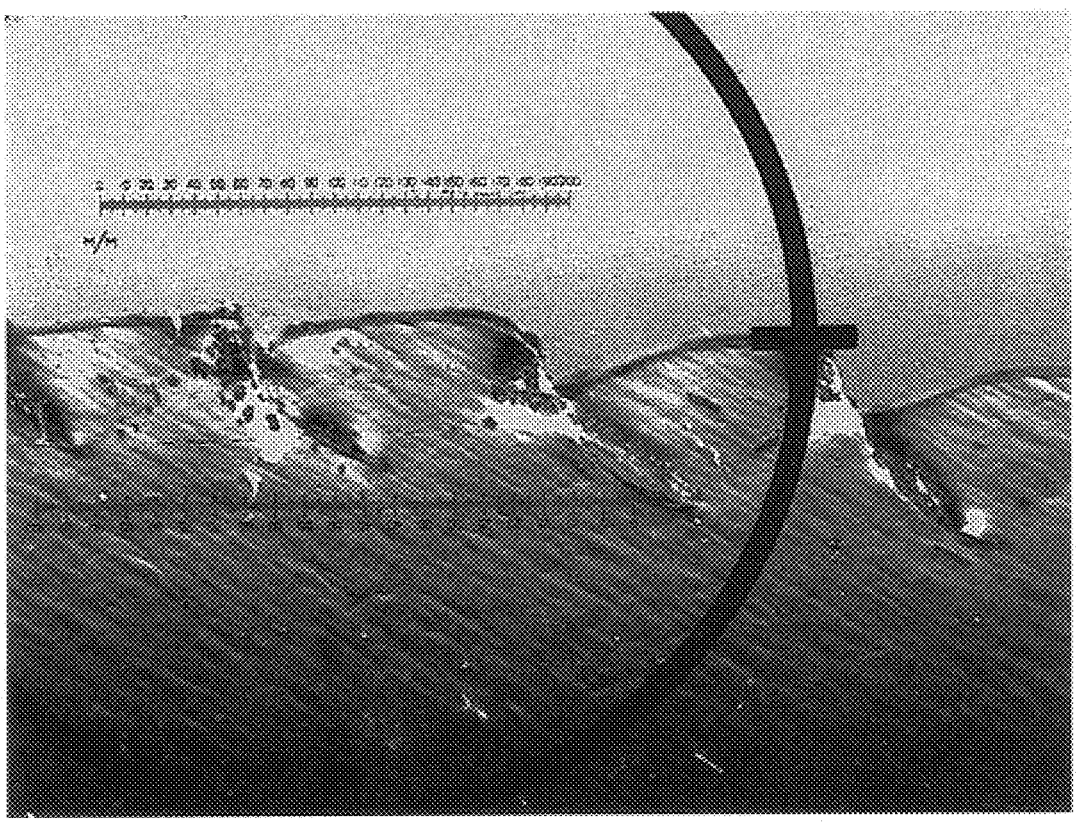
FIG. 12 is a microphotograph of a severed edge of a film of a prior art film.

Films produced according to this invention and comparative films described herein were dispensed on a serrated plastic blade (3M Catalog #105 available as of the filing date hereof from Minnesota Mining and Manufacturing Company, St. Paul, Minn.) by hand by pulling the tape straight down across the dispenser blade. The test specimens thus obtained were mounted on a glass microscope slide to obtain images of the severed edges. Photographic images were obtained using an Olympus BHSM Type BH-2 optical microscope available commercially from Leeds Precision Instruments, Inc., Minneapolis, Minn. Photographic images were obtained with reflected light and Polaroid Type 57 black & white instant print film having an ASA of 3000. Each image contains a 2 mm scale bar for reference. FIG. 11 is an edge of a film of the present invention severed as described above, while FIG. 12 is an edge of a prior art film, also severed as described above.

Gloss Test Method

The gloss of example film constructions was measured according to ASTM D2457-97. The gloss meter used in the measurement was a Haze-Gloss Reflectometer, Cat. No. 4601 available from BYK-Gardner USA of Columbia, Md. Sample specimens 15 cm by 15 cm in size were cut from film sheets so that no oil, dirt, dust or fingerprints were present in the section to be measured. The specimens were then mounted by hand on the sample support table of the haze-gloss reflectometer and the measurement is made at an angle of light incidence of 60°.

Percent Area Coverage of Pencil

Percent area coverage of pencil was determined as follows: A writing machine was used to write on a sample with a pencil at a 60 angle with added weights. Quantitative image analysis was then used to determine the area percent coverage of the pencil lead. Pencil percent area coverage results are shown in Table 9. As a comparison, the percent area coverage of pencil on cellulose acetate is 0.9% and on paper is 0.4%.

Total Percent Light Transmission Test Method

The total percent light transmission of example film constructions was measured according to ASTM D1003-97. Measurements were made using a Haze-gard plus, Cat. No. 4725 available from BYK-Gardner USA of Columbia, Md. Sample specimens 15 cm by 15 cm in size were cut from film sheets so that no oil, dirt, dust or fingerprints were present in the section to be measured. The specimens were then mounted by hand across the haze port of the hazemeter and the measurement activated. Ten replicate total percent light transmission measurements were taken, and the average of these 10 measurements reported as the transmission value herein.

Scanning Electron Microscopy (SEM)

Scanning electron microscopy (SEM) pictures of the film surface were taken using a Hitachi S-530 scanning electron microscope. Electron beam power was 20 kV. Magnification was 150 times.

PREPARATION OF EXAMPLES

Polymer resins used for secondary and primary layers of the films of Examples 1–49 are listed in Table 1, and Examples 50–55 are listed in Table 6. The layer ratios (by weight) that were used are listed in Table 2 and Table 7. The primary layer thickness was kept constant at about 80% of the total film thickness in all cases, except for Examples 21 and 22, in which the primary layer thickness was about 90%.

Simultaneous Stretching Process

Simultaneously biaxially oriented multi-layered films as set out in Examples 1–43 and 49 were prepared using the process described in U.S. Pat. Nos. 4,675,582; 4,825,111; 4,853,602; 5,036,262; 5,051,225; and 5,072,493. The simultaneous stretching process was carried out on a simultaneous stretching equipment built by Brückner Maschinenbaü, Seigsdorf, Germany.

In Example 1, the multilayer film consisted of about 80% propylene copolymer G in the primary layer, with about 20% of propylene homopolymer B in the secondary layers (about 10% on each side of the primary layer). Specifically, for the primary layer, a Berstorff 6.0 cm twin screw extruder was used to produce a stable melt having a melt temperature of from about 202° to 265° C.

For the secondary layers, a HPM 4.45 cm single screw extruder was used to produce a stable melt having a melt temperature of from about 195° to 245° C.

The melts were transferred to a Cloeren 3-layer coextrusion die equipped with a selector housing. In Examples Ex 1 to Ex 20 and Ex 27 to Ex 43, an "ABA" selector plug was installed so that the polymer melt "A" from the HPM extruder flowed through channels so as to sandwich the melt "B" from the Berstorff extruder thus internally forming a three layer secondary/primary/secondary or "ABA" sandwich of melts and then this three layer melt was extruded through a slot die and cast onto a water-cooled steel casting wheel rotating at about 4.7 to 6.8 meters per minute and that was maintained at a temperature in the range of 20° to 30° C. using internal water circulation and by immersing the casting wheel in a water bath. The cast sheet had a width of about 35 cm and a thickness of about 0.15–0.20 cm.

In Examples Ex 21 and 22, an "ABB" selector plug was installed so that the polymer melt "A" from the HPM extruder flowed through one outside channel. The melt "B" from the Berstorff extruder was channeled to the primary and to one of the sides thus internally forming a three layer "A/B/B" sandwich of melts and then this three layer melt was extruded through a slot die. Casting was completed as already described.

In Examples Ex 23–26, multilayer films with a 5-layer construction were prepared. The construction may be referred to as a "ACBCA" construction with the "A" secondary layers consisting of polymer(s) having been extruded through the HPM extruder as described above and the "B" primary layer consisting of polymer(s) having been extruded through the Berstorff extruder as described above. The "C" layers consisted of polymer(s) that were extruded through a 3.8 cm Davis Standard single screw extruder, Model DS15. Stable melts having melt temperatures of about 250° C. were produced. Selector plugs were installed so that firstly, polymer melt "C" was channeled to each side of the polymer "B" melt stream to form a multilayer "CBC" melt stream, then polymer melt "A" was channeled to each side of this "CBC" multilayer polymer melt stream. The resulting "ACBCA" layered melt stream then exited the die and casting onto a water-cooled steel casting wheel was completed as already described. Polymer components comprising the "A", "B", and "C" layers are identified in Tables 1 and 2.

The cast sheet was passed through a bank of IR heaters set to about 600° C. to preheat the cast film prior to simultaneous stretching in the tenter oven. The cast and preheated film was immediately simultaneously stretched in longitudinal (MD) and transverse (TD) directions to produce biaxially oriented film. Final area stretch ratios of about 45:1 to about 75:1 were used. The MD and TD ratios were kept approximately constant at about 7.5–8.0 X for the MDR and about 7.0X for the TDR, so that the films were stretched either about the same in each of the MD and TD, or preferably, more in the MD than in the TD.

The tenter oven temperature set-points used in the preheat, stretching, and annealing sections of the tenter for each example are listed in Table 3. For Ex 1, the preheat zones in the tenter were set to about 207° C., the stretching zones were set to about 175° C., and the annealing zones were set to about 130° C. The films were about 0.030 mm thick and the slit widths were about 127 cm. Windup speeds of about 45 meters per minute were used. The film was slit (offline) in the machine direction and the transverse direction into useful sample widths for testing using a razor blade cutter equipped with fresh blades. Film mechanical properties are shown in Table 4. Molecular orientation data is set out in Tables 5a and 5b.

Sequential Stretching Process

Examples 44–48 were prepared as follows.

In Example 44, the multilayer film consisted of about 80% propylene copolymer G in the primary layer, and about 20% of propylene homopolymer B (PP-B) in the secondary layers (about 10% in on each side of the primary layer) based on outputs of the three extruders. The primary polymer was fed to a 4.45 cm single screw extruder manufactured by H. P. M., Mt. Gilead, Ohio. The secondary layer polymer on one of the sides (the side which contacted the casting wheel) of the primary was fed to a 2.54 cm single screw extruder manufactured by Davis-Standard, Pawtucket, Conn. (Model number D5-10-HM15). The secondary layer polymer on the other side of the primary (the side which did not contact the casting wheel) was fed to a 3.18 cm single screw extruder manufactured by Brabender, S. Hackensack, N.J. (Type D-51 with Controller Type SP-T2504D). The polymers were heated to about 252° C. using extruder barrel zone heating set points of about 194° up to about 240–260° C. The melts were transferred to a feed block, allowed to internally form a three-layer secondary/primary/secondary sandwich of melts and then this sandwich was extruded through a 17.8 cm sheet die. The three layer extrudate was cast onto a rotating smooth steel casting wheel maintained at about 60° C. with a circulating water bath, in which a portion of the wheel was immersed. The casting wheel temperature was also maintained by circulated ambient (60° C.) temperature water.

The cast film was passed over a set of rollers internally heated to 125° C. and stretched in the longitudinal or machine direction (MD) to a stretch ratio of about 5:1. The MD stretched sheet was next gripped edgewise in a series of clips on divergent tenter rails and stretched in the crosswise or transverse direction (TD) to a final TD stretch ratio of about 9:1. The specific stretching conditions and tenter temperature conditions are listed in Table 3. The resulting biaxially stretched film was cooled to room temperature, its edges trimmed by razor slitting and wound onto a master roll at about 10 meters per minute. The films were about 0.028 to 0.038 mm thick and the slit widths were about 25–30 cm. The film was slit in the machine direction and the transverse direction into useful sample widths for testing using a razor blade cutter equipped with fresh blades. The film properties are shown in Table 4. Molecular orientation data is set out in Tables 5a and 5b.

Results & Discussion Section

Examples 44–48 were produced using a sequential orientation process. This process is typically less suitable for the purposes of the present invention, in that the sequential samples exhibit excessive MD elongation and high values of the puncture energy as determined by WAXS and birefringence measurements. Example 47, while exhibiting a low value of puncture energy, also exhibited very high elongation that causes this sample to stretch, deform and become difficult to cut using a typical adhesive tape dispenser.

Examples 1 and 2 are instances of films that had a desirable melting point differential between the secondary layers and the primary layer, as well as proper orientation. These examples had low puncture energy and tensile elongation, and severed easily on the blade of commercially available adhesive tape dispensers. In addition, these examples were readily torn by hand even when edge-slit using sharp razor blades.

Example 3 is a film having proper orientation but inadequate differential in melting point between the secondary layers and the primary layer. This gave rise to a film having undesirably high puncture energy and toughness, making it difficult to sever using commercially available adhesive tape dispensers.

Example 12 contained a nucleating agent in the primary layer, that imparted clarity and improved stiffness to the film. Typically, a film having high stiffness or modulus is more easily handled in conventional web handling equipment.

Examples 15–20 had blended resins in the secondary layers, the majority component thereof having an adequate melting point differential to the primary layer polymer. Incorporation of lower melting or even primary layer resins into secondary layers improved adhesion between skin and primary layers, aided processability, or improved clarity.

Examples 21–22 describe 2-layer constructions having proper orientation and sufficient melting point differential between the skin and primary layers to provide low values of puncture energy. Such films can be useful in certain packaging applications and in tape backings in cases where the stress encountered during processing or roll unwinding is high enough to cause partial delamination of an additional layer if present.

Examples had a slight transverse character, which surprisingly does not strongly affect the puncture energy or utility of such film backings. This was not the case as for Examples 44 to 48, which had a large negative value of birefringence and subsequently high MD tensile elongation and in most cases high values of puncture energy, along with uneven or distorted severed edges when dispensed using commercially available adhesive tape dispensers.

Examples 39, 40, 42 and 43 along with Examples 38 and 41 illustrated the effect of addition of hydrocarbon tackifying resins to the primary layer of the film. As these cases show the tackifying resins tended to improve puncture energy and to reduce break stress values. These Examples in addition were noticeably more stiff than the comparative Examples made without tackifying resins. As mentioned earlier, stiffer films are often preferable to softer films in regard to subsequent web handling operations. It is preferred that such resins be added to the primary layer to avoid migration or bleeding to surfaces where they may increase the tendency of adjacent film layers to become mutually adhered.

TABLE 1

Polymer Identification

| Polymer ID | General description | Supplier | Grade | MFR* (g/10 min) | % Ethylene* (by weight) | Tm (DSC) (° C.) |
|---|---|---|---|---|---|---|
| A | PP homopolymer | Fina | PP 3374 | 2.5 | 0.0 | 161.5 |
| B | PP homopolymer | Fina | PP 3571 | 9.0 | 0.0 | 160.4 |
| C | PP copolymer | Exxon | Escorene 4792-E1 | 2.8 | 0.5 | 158.4 |
| D | PP copolymer | Aristech | FF036Q2 | 3.4 | 0.7 | 157.0 |
| E | PP copolymer | Fina | PP 6253 | 1.5 | 2.0 | 146.2 |
| F | PP copolymer | Exxon | Escorene 9852 | 2.1 | 2.1 | 149.0 |
| G | PP copolymer | Exxon | Escorene 9122 | 2.1 | 2.1 | 149.0 |
| H | PP copolymer | Fina | PP 7825 | 30.0 | 3.0 | 137.5 |
| I | Nucleated homopolymer | Exxon | 1043N | 5.5 | 0.0 | 167.5 |
| J | PP homopolymer | Fina | PP 3376 | 2.5 | 0.0 | 161.5 |
| K | PP homopolymer | Fina | EOD 00-35 | 3.6 | 0.0 | 149.0 |
| L | Tackifier | Hercules | Regalrez 1139 | | | |
| M | Tackifier | Exxon | 5340 | | | |

*MFR at 230° C., 2.16 kg condition and ethylene content as reported by manufacturer.

Examples 23–26 demonstrated 5 layer film constructions in which a tie layer was incorporated to modify interlayer adhesion as well as overall film properties as desired. Such tie layers were present in sufficiently small quantities so as to contribute very little to overall film mechanical behavior.

Examples 28–30 demonstrated the effect of resin blending in the primary layer, in particular the effect of addition of more crystalline isotactic polypropylene. In these cases the films gained stiffness at the expense of increasing puncture energy, but were useful in providing more stable web handling in subsequent converting operations.

Examples 32, 33, and 35 were simultaneously biaxially stretched so as to provide a decreased MD stretching ratio of 5.5. Surprisingly, these cases while exhibiting an increase in tensile elongation still retained low puncture energy values and were readily severable or torn by hand. As is shown in Table 5b, the molecular orientation as measured for these

TABLE 2

Film Constructions

| ID | Layer Construction | Layer Wt. Percentages | Primary Layer B | Secondary layer A | Intermediate Layer C |
|---|---|---|---|---|---|
| Ex 1 | ABA | 10/80/10 | G | B | |
| Ex 2 | ABA | 10/80/10 | E | C | |
| Ex 3 | ABA | 10/80/10 | A | B | |
| Ex 4 | ABA | 10/80/10 | E | C | |
| Ex 5 | ABA | 10/80/10 | E | C | |
| Ex 6 | ABA | 10/80/10 | E | C | |
| Ex 7 | ABA | 10/80/10 | E | B | |
| Ex 8 | ABA | 10/80/10 | 85/15 H/B | B | |
| Ex 9 | ABA | 10/80/10 | 85/15 E/D | D | |
| Ex 10 | ABA | 10/80/10 | E | C | |

TABLE 2-continued

Film Constructions

| ID | Layer Construction | Layer Wt. Percentages | Primary Layer B | Secondary layer A | Intermediate Layer C |
|---|---|---|---|---|---|
| Ex 11 | ABA | 10/80/10 | E | C | |
| Ex 12 | ABA | 10/80/10 | 85/15 E/I | J | |
| Ex 13 | ABA | 10/80/10 | G | B | |
| Ex 14 | ABA | 10/80/10 | E | B | |
| Ex 15 | ABA | 10/80/10 | 85/15 E/D | 75/25 D/E | |
| Ex 16 | ABA | 10/80/10 | E | 75/25 D/E | |
| Ex 17 | ABA | 10/80/10 | E | D | |
| Ex 18 | ABA | 10/80/10 | E | 75/25 D/E | |
| Ex 19 | ABA | 10/80/10 | E | 60/40 D/E | |
| Ex 20 | ABA | 10/80/10 | E | 50/50 D/E | |
| Ex 21 | ABB | 10/90 | E | D | |
| Ex 22 | ABB | 10/90 | E | D | |
| Ex 23 | ACBCA | 7/3/80/3/7 | E | C | C |
| Ex 24 | ACBCA | 7/3/80/3/7 | E | C | C |
| Ex 25 | ACBCA | 7/3/80/3/7 | E | 75/25 C/E | C |
| Ex 26 | ACBCA | 7/3/80/3/7 | E | 75/25 C/E | 50/50 C/E |
| Ex 27 | ABA | 10/80/10 | D | C | |
| Ex 28 | ABA | 10/80/10 | 50/50 E/D | C | |
| Ex 29 | ABA | 10/80/10 | 85/15 H/B | B | |
| Ex 30 | ABA | 10/80/10 | 90/10 E/B | B | |
| Ex 31 | ABA | 10/80/10 | E | B | |
| Ex 32 | ABA | 10/80/10 | E | 75/25 D/E | |
| Ex 33 | ABA | 10/80/10 | E | 75/25 D/E | |
| Ex 34 | ABA | 10/80/10 | E | 75/25 D/E | |
| Ex 35 | ABA | 10/80/10 | E | 90/10 D/E | |
| Ex 36 | ABA | 10/80/10 | E | 90/10 D/E | |
| Ex 37 | ABA | 10/80/10 | E | J | |
| Ex 38 | ABA | 10/80/10 | E | D | |
| Ex 39 | ABA | 10/80/10 | 90/10 E/M | D | |
| Ex 40 | ABA | 10/80/10 | 90/10 E/L | D | |
| Ex 41 | ABA | 10/80/10 | E | D | |
| Ex 42 | ABA | 10/80/10 | 90/10 E/M | D | |
| Ex 43 | ABA | 10/80/10 | 90/10 E/L | D | |
| Ex 44 | ABA | 10/80/10 | G | B | |
| Ex 45 | ABA | 10/80/10 | E | C | |
| Ex 46 | ABA | 10/80/10 | A | A | |
| Ex 47 | ABA | 10/80/10 | E | C | |
| Ex 48 | ABA | 10/80/10 | E | C | |
| Ex 49 | ABA' | 10/80/10 | 85/15 K/J | A = J, A' = B | |

TABLE 3

Processing Conditions

| ID | Stretch Process | T1 preheat (° C.) | T2 Stretching (° C.) | T3 anneal (° C.) | MDR* |
|---|---|---|---|---|---|
| Ex 1 | SIMULTANEOUS | 192 | 152 | 130 | 7.5 |
| Ex 2 | SIMULTANEOUS | 192 | 148 | 130 | 7.5 |
| Ex 3 | SIMULTANEOUS | 192 | 162 | 130 | 7.5 |
| Ex 4 | SIMULTANEOUS | 200 | 148 | 130 | 7.5 |
| Ex 5 | SIMULTANEOUS | 192 | 148 | 160 | 7.5 |
| Ex 6 | SIMULTANEOUS | 192 | 140 | 160 | 7.5 |
| Ex 7 | SIMULTANEOUS | 192 | 152 | 130 | 7.5 |
| Ex 8 | SIMULTANEOUS | 173 | 141 | 130 | 7.5 |
| Ex 9 | SIMULTANEOUS | 198 | 148 | 130 | 7.5 |
| Ex 10 | SIMULTANEOUS | 192 | 140 | 130 | 7.5 |
| Ex 11 | SIMULTANEOUS | 188 | 144 | 130 | 7.5 |
| Ex 12 | SIMULTANEOUS | 182 | 140 | 130 | 7.5 |
| Ex 13 | SIMULTANEOUS | 200 | 148 | 130 | 7.5 |
| Ex 14 | SIMULTANEOUS | 188 | 148 | 130 | 7.5 |
| Ex 15 | SIMULTANEOUS | 198 | 148 | 130 | 7.5 |
| Ex 16 | SIMULTANEOUS | 198 | 148 | 130 | 7.5 |
| Ex 17 | SIMULTANEOUS | 195 | 143 | 130 | 7.5 |
| Ex 18 | SIMULTANEOUS | 195 | 143 | 130 | 7.5 |
| Ex 19 | SIMULTANEOUS | 195 | 143 | 130 | 7.5 |
| Ex 20 | SIMULTANEOUS | 195 | 143 | 130 | 7.5 |
| Ex 21 | SIMULTANEOUS | 192 | 140 | 130 | 7.5 |
| Ex 22 | SIMULTANEOUS | 192 | 140 | 130 | 7.5 |
| Ex 23 | SIMULTANEOUS | 192 | 140 | 130 | 7.5 |
| Ex 24 | SIMULTANEOUS | 198 | 148 | 130 | 7.5 |
| Ex 25 | SIMULTANEOUS | 192 | 140 | 130 | 7.5 |
| Ex 26 | SIMULTANEOUS | 192 | 140 | 130 | 7.5 |
| Ex 27 | SIMULTANEOUS | 198 | 150 | 130 | 7.5 |
| Ex 28 | SIMULTANEOUS | 192 | 140 | 130 | 7.5 |
| Ex 29 | SIMULTANEOUS | 175 | 143 | 130 | 7.5 |
| Ex 30 | SIMULTANEOUS | 192 | 140 | 130 | 7.5 |
| Ex 31 | SIMULTANEOUS | 192 | 140 | 130 | 7.5 |
| Ex 32 | SIMULTANEOUS | 195 | 143 | 130 | 5.5 |
| Ex 33 | SIMULTANEOUS | 190 | 143 | 130 | 5.5 |
| Ex 34 | SIMULTANEOUS | 190 | 143 | 130 | 7.5 |
| Ex 35 | SIMULTANEOUS | 192 | 140 | 130 | 5.5 |
| Ex 36 | SIMULTANEOUS | 192 | 140 | 130 | 7.5 |
| Ex 37 | SIMULTANEOUS | 182 | 140 | 130 | 5.5 |
| Ex 38 | SIMULTANEOUS | 194 | 140 | 130 | 7.5 |
| Ex 39 | SIMULTANEOUS | 194 | 140 | 130 | 7.5 |
| Ex 40 | SIMULTANEOUS | 194 | 140 | 130 | 7.5 |
| Ex 41 | SIMULTANEOUS | 194 | 144 | 130 | 7.5 |
| Ex 42 | SIMULTANEOUS | 194 | 144 | 130 | 7.5 |
| Ex 43 | SIMULTANEOUS | 194 | 144 | 130 | 7.5 |
| Ex 44 | SEQUENTIAL | 152 | 152 | 152 | 5 |
| Ex 45 | SEQUENTIAL | 152 | 152 | 152 | 5 |
| Ex 46 | SEQUENTIAL | 160 | 160 | 160 | 5 |
| Ex 47 | SEQUENTIAL | 165 | 165 | 165 | 5 |
| Ex 48 | SEQUENTIAL | 160 | 160 | 160 | 5 |
| Ex 49 | SIMULTANEOUS | 182 | 152 | 140 | 7.5 |

*MDR Machine Direction Stretch Ratio

TABLE 4

Machine Direction Film Properties

| Example | Haze (%) | Puncture Energy 2.54 cm (J/cm²) | Puncture Energy 1.27 cm (J/cm²) | Tensile Break Stress (MPa) | Tensile Elongation (%) |
|---|---|---|---|---|---|
| Ex 1 | 0.80 | 10.4 | 39.0 | 88 | 64 |
| Ex 2 | 0.41 | 7.7 | 22.7 | 67 | 44 |
| Ex 3 | 0.57 | 29.4 | 94.9 | 213 | 76 |
| Ex 4 | 3.32 | 6.7 | 22.9 | 64 | 62 |
| Ex 5 | 2.80 | 7.9 | 23.6 | 66 | 53 |
| Ex 6 | 0.82 | 7.7 | 24.7 | 67 | 40 |
| Ex 7 | 3.12 | 8.5 | 31.8 | 73 | 53 |
| Ex 8 | 0.16 | 15.6 | 58.8 | 121 | 88 |
| Ex 9 | 0.52 | 9.7 | | 68 | 59 |
| Ex 10 | 0.30 | 8.3 | 25.5 | 71 | 50 |
| Ex 11 | 0.31 | 9.7 | 24.8 | 76 | 50 |
| Ex 12 | 0.38 | 13.2 | | 106 | 65 |
| Ex 13 | 2.73 | 5.5 | 40.1 | 63 | 48 |
| Ex 14 | 0.38 | 9.3 | 36.5 | 75 | 55 |
| Ex 15 | 1.01 | 10.0 | | 83 | 74 |
| Ex 16 | 0.57 | 6.4 | | 62 | 73 |
| Ex 17 | 2.75 | 5.9 | | 63 | 63 |
| Ex 18 | 0.74 | 6.3 | | 64 | 58 |
| Ex 19 | 0.78 | 5.8 | | 60 | 62 |
| Ex 20 | 0.69 | 4.5 | | 57 | 69 |
| Ex 21 | 0.76 | 11.4 | | 112 | 60 |
| Ex 22 | 0.65 | 12.2 | | 82 | 62 |
| Ex 23 | 0.62 | 9.1 | | 80 | 53 |
| Ex 24 | 3.96 | 7.1 | | 66 | 56 |
| Ex 25 | 0.50 | 9.1 | | 76 | 51 |
| Ex 26 | 0.54 | 9.7 | | 75 | 60 |
| Ex 27 | 0.43 | 21.4 | 69.4 | 178 | 83 |
| Ex 28 | 0.36 | 18.4 | 63.1 | 171 | 68 |
| Ex 29 | 0.15 | 17.8 | 53.3 | 176 | 58 |
| Ex 30 | 0.54 | 14.9 | 48.7 | 117 | 64 |
| Ex 31 | 0.27 | 8.1 | | 74 | 52 |

TABLE 4-continued

Machine Direction Film Properties

| Example | Haze (%) | Puncture Energy 2.54 cm (J/cm$^2$) | Puncture Energy 1.27 cm (J/cm$^2$) | Tensile Break Stress (MPa) | Tensile Elongation (%) |
|---|---|---|---|---|---|
| Ex 32 | 1.21 | 6.4 | | 54 | 110 |
| Ex 33 | 0.59 | 9.1 | | 60 | 100 |
| Ex 34 | 0.44 | 9.2 | | 87 | 58 |
| Ex 35 | 0.53 | 7.8 | | 55 | 97 |
| Ex 36 | 0.51 | 7.3 | | 81 | 50 |
| Ex 37 | 0.38 | 7.0 | | 70 | 39 |
| Ex 38 | 0.49 | 12.2 | | 94 | 69 |
| Ex 39 | 0.93 | 7.1 | | 60 | 33 |
| Ex 40 | 0.58 | 7.5 | | 68 | 59 |
| Ex 41 | 0.84 | 7.9 | | 72 | 50 |
| Ex 42 | 0.65 | 8.0 | | 58 | 22 |
| Ex 43 | 0.55 | 7.9 | | 68 | 63 |
| Ex 44 | 2.59 | 59.9 | | 150 | 158 |
| Ex 45 | 2.42 | 48.9 | | 167 | 151 |
| Ex 46 | 0.88 | 96.8 | | 147 | 177 |
| Ex 47 | 5.02 | 4.2 | | 32 | 208 |
| Ex 48 | 1.92 | 36.3 | | 97 | 185 |
| Ex 49 | 0.39 | 6.3 | | 71 | 47 |

TABLE 5a

Film Orientation Properties
WAXS (110) Plane Scattering

| Examples | Peak Maximum Angle (°) | FWHM (°) | Height (counts) |
|---|---|---|---|
| Ex 1 | 96 | 59.2 | 521 |
| Ex 2 | 95 | 61.1 | 410 |
| Ex 3 | 94 | 50.6 | 575 |
| Ex 44 | 100 | 62.1 | 489 |
| | 181 | 35.7 | 2850 |
| Ex 45 | 87 | 51.2 | 529 |
| | 177 | 42.0 | 2409 |
| Ex 46 | 89 | 52.2 | 323 |
| | 175 | 29.8 | 3384 |

TABLE 5b

Film Orientation Properties
(Index of Refraction)

| Examples | Refractive Index ($n_{MD}$) | Refractive Index ($n_{TD}$) | Birefringence ($\Delta n_{MD-TD} \times 10^{-3}$) |
|---|---|---|---|
| Ex 1 | 1.5093 | 1.5071 | 2.20 |
| Ex 44 | 1.5023 | 1.5119 | -9.60 |
| Ex 2 | 1.5091 | 1.5042 | 4.90 |
| Ex 45 | 1.5047 | 1.5102 | -5.50 |
| Ex 3 | 1.5137 | 1.5037 | 6.40 |
| Ex 46 | 1.5011 | 1.5154 | -14.30 |
| Ex 4 | 1.5108 | 1.5062 | 4.60 |
| Ex 47 | 1.5023 | 1.5102 | -7.90 |
| Ex 5 | 1.5108 | 1.5044 | 6.40 |
| Ex 48 | 1.5042 | 1.5126 | -8.40 |
| Ex 6 | 1.5086 | 1.5036 | 5.00 |
| Ex 17 | 1.5093 | 1.5046 | 4.70 |
| Ex 32 | 1.5068 | 1.5075 | -0.70 |
| Ex 18 | 1.509 | 1.5048 | 4.20 |
| Ex 33 | 1.5051 | 1.5059 | -0.80 |
| Ex 34 | 1.5086 | 1.5040 | 4.60 |
| Ex 35 | 1.5068 | 1.5088 | -2.00 |
| Ex 36 | 1.5084 | 1.5038 | 4.60 |

Sequential Stretching Process

Examples 50–55 were prepared as follows (and are not included in Table 2)

Example 50

A three-layer film construction was prepared. The construction may be referred to as an "ABC" construction with the "C" surface layer (the side which did not contact the casting wheel), the "B" core layer, and the "A" second surface layer (the side which contacted the casting wheel). The three-layer film was prepared using a co-extrusion process from a flat-film die.

The polymers used in layer A, B, and C are described in Table 6. Layer B and layer A comprises polymer PP1. The surface finishing layer (layer C) comprises a blend of 20/40/40 CC/PP2/HDPE2 as described in Table 7. The blend was prepared by feeding 1.4 kg/hr CC, 2.7 kg/hr PP2, and 2.7 kg/hr HDPE2 into a 27 mm co-rotating twin screw extruder manufactured by Leistritz, Somerville, N.J. The blend was heated to about 230° C. using barrel zone heating set points of about 195° C. to 230° C. The blend was extruded through a strand die and the strands were passed through a water bath maintained at a temperature of about 15° C. The strands were then chopped into pellets using a rotating knife.

The core layer (layer B) polymer was fed to a 4.45 cm single screw extruder manufactured by H. P. M., Mt. Gilead, Ohio. The surface layer (layer C) polymer blend was fed to a 3.18 cm single screw extruder manufactured by Brabender, S. Hackensack, N.J. The second surface layer (layer A) polymer was fed to a 2.54 cm single screw extruder manufactured by Davis-Standard, Pawtucket, Conn. The polymers were heated to about 250° C. using extruder barrel zone heating set points of about 194° C. to 250° C. The polymer melts were transferred to a three layer feedblock and then into a 17.8 cm wide sheet die, both manufactured by Cloeren Inc., Orange, Tex. A three-layer sheet with a thickness of 1.37 mm was cast onto a rotating smooth steel casting wheel maintained at about 50° C. The sheet is then immersed in a 20° C. water bath.

The cast film was heated by passing it over a set of rollers internally heated to 120° C. and then stretched in the longitudinal or machine direction (MD) to a stretch ratio of about 5:1. The MD stretched sheet was next gripped edgewise in a series of clips on divergent tenter rails and stretched in the crosswise or transverse direction (TD) to a final TD stretch ratio of about 9:1. The specific stretching conditions and tenter temperature conditions are listed in Table 8. The resulting biaxially stretched film was cooled to room temperature, its edges trimmed by razor slitting and wound onto a master roll at about 10 meters per minute. The film is about 0.030 mm thick, with the core layer (B) having a thickness of about 0.021 mm and each surface layer having a thickness of about 0.0045 mm. The film properties are shown in Table 9. The SEM shown in FIG. 13 illustrates a surface that is significantly free of voids and cracks. The SEM also shows a multitude of ridges on the surface of the film that creates a low gloss surface.

Example 51

Example 50 was repeated. The blend used in Layer C comprised a blend of 20/40/40 CC/RCP3/HDPE2 as described in Table 7. The polymer used in layer B comprised RCP1. The processing conditions used to prepare this example are shown in Table 8. The film properties are set forth in Table 9. The SEM shown in FIG. 14 illustrates a surface that is significantly free of voids and cracks and a multitude of ridges on the surface of the film that creates a low gloss surface.

Example 52

Figure 15:
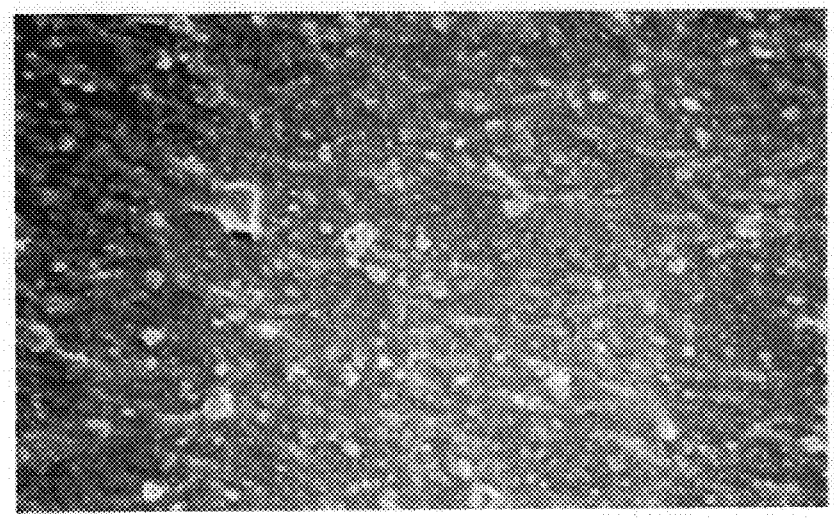
FIG. 15 is a scanning electron micrograph of a film of the present invention.

Example 51 was repeated. Stretching temperature, T2, was lowered to 142° C. The film properties are shown in Table 9. The SEM shown in FIG. 15 illustrates a surface that is significantly free of voids and cracks and a multitude of ridges on the surface of the film that creates a low gloss surface.

Example 53

Figure 16:
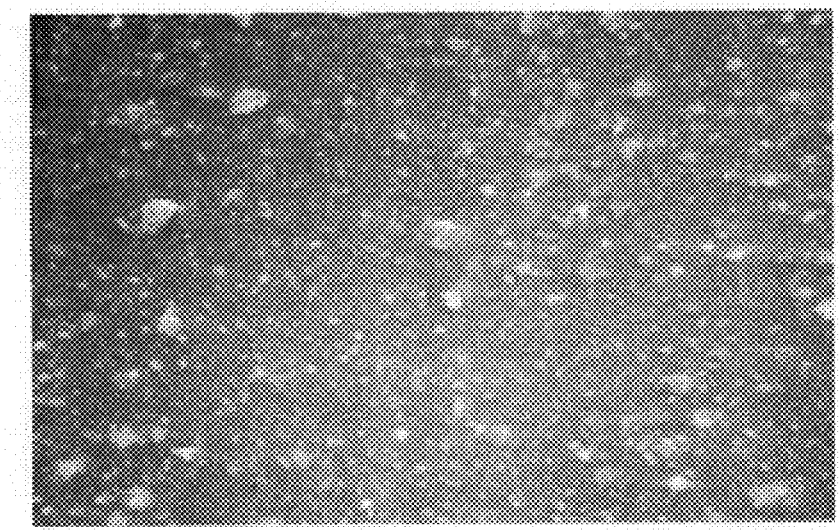
FIG. 16 is a scanning electron micrograph of a prior art film.

Example 52 was repeated with the blend used in Layer C comprising a blend of 20/40/40 CC/RCP2/HDPE as described in Table 7. The random copolymer used in the blend had a melt flow of 4 g/10 min. The haze and gloss values this example did not achieve the desired values of the present invention as shown in Table 9. The SEM shown in FIG. 16 illustrates a surface that is significantly free of voids and cracks. However, the film surface lacked a multitude of ridges, resulting in a film with a gloss value outside of the scope of the present invention.

Example 54

Figure 17:
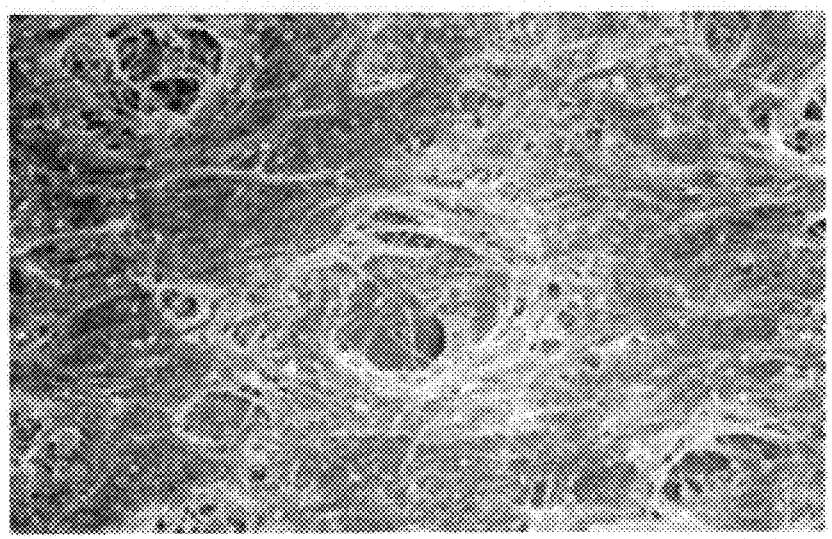
FIG. 17 is a scanning electron micrograph of a prior art film.

Example 50 was repeated at a lower stretching temperature, T2, as described in Table 8. The polymer used in layer B comprising RCP1 as shown in Table 7. The stretching temperature was lower than the melting point of the polypropylene used in the blend of layer C. The properties of the film did not meet the desired values shown in Table 9. There was large scale voiding of the polymer surrounding the calcium carbonate particles of the surface layer as evident in the SEM of FIG. 17. It was not possible to write on the matte surface of the film without scratching and removing the matte surface layer with the pencil lead.

Example 55

Figure 18:
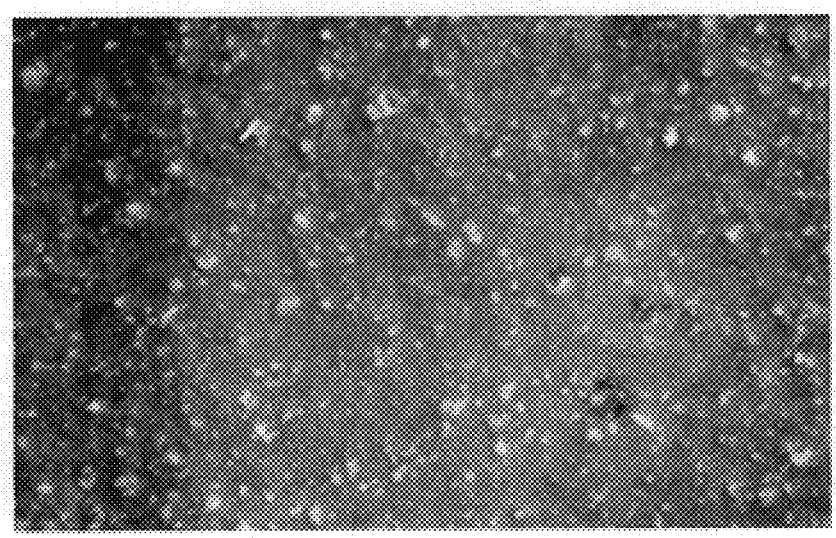
FIG. 18 is a scanning electron micrograph of a prior art film.

Example 50 was repeated with the blend used in Layer C comprising a blend of 20/40/40 CC/PP2/HDPE1 as described in Table 7. The high-density polyethylene used in the blend had a melt flow of 7 g/10 min. The haze and gloss values of this example did not achieve the desired values of the present invention as shown in Table 9. The SEM shown in FIG. 18 shows a surface that was significantly free of voids and cracks. However, the film surface lacked a multitude of ridges, resulting in a film with a gloss value outside of the scope of the present invention.

Simultaneous Stretching Process

Simultaneously biaxially oriented multi-layered films as set out in Examples 56–57 were prepared using the process described in U.S. Pat. Nos. 4,675,582; 4,825,111; 5,853,602; 5,036,262; 5,051,225; and 5,072,493. The simultaneous stretching process was carried out on simultaneous stretching equipment built by Brückner Maschinenbau, Seigsdorf, Germany.

Example 56

A three-layer film construction was prepared. The construction may be referred to as an "ABC" construction with the "C" secondary layer (the side which did not contact the casting wheel), the "B" primary layer, and the "A" surface finishing layer (the side which contacted the casting wheel). The three-layer film was prepared using a coextrusion process from a flat-film die.

The materials used in layer A, B, and C are described in Table 6. The film construction is described in Table 7.

The C layer comprises a blend of 20/40/40 CC/RCP3/HDPE2. The blend was prepared by feeding 20 kg/hr CC, 40 kg/hr RCP3, and 40 kg/hr HDPE2 into a 50 mm co-rotating twin screw extruder manufactured by APV, Grand Rapids, Mich. The blend was heated to about 230° C. using barrel zone heating set points of about 190° C. to 230° C. The blend was extruded through a strand die and the strands were passed through a water bath maintained at a temperature of about 15° C. The strands were then chopped into pellets using a rotating knife.

The core layer (layer B) polymers were fed to a 6.0 cm co-rotating twin screw extruder manufactured by Berstorff, Hannover, Germany. The surface layer (layer C) blend, as prepared above, was fed to a 3.81 cm single screw extruder manufactured by Davis-Standard, Pawtucket, Conn. The second surface layer (layer A) was fed to a 4.45 cm single screw extruder manufactured by H. P. M., Mt. Gilead, Ohio. The polymers were heated to about 250° C. using extruder barrel zone heating set points of about 190° C. to 250° C., producing a stable melt stream.

The melts were transferred to a Cloeren 3-layer coextrusion die equipped with a selector housing and an "ABC" selector plug such that the a three layer "A/B/C" sandwich of polymer melt was extruded through a slot die and cast onto a water-cooled steel casting wheel rotating at about 5.0 meters per minute. The casting wheel was maintained at a temperature of about 20° C. using internal water circulation and by immersing the casting wheel in a water bath.

The cast sheet was passed through a bank of IR heaters set to about 500° C. to preheat the cast film prior to simultaneous stretching in the tenter oven. The cast and preheated film was immediately simultaneously stretched in longitudinal (MD) and transverse (TD) directions to produce biaxially oriented film. Final area stretch ratio of about 49:1 was used. The MD and TD ratios were kept approximately constant at about 7.5 times for the MDR and about 6.5 to 7.0 times for the TDR, so that the film was stretched either about the same in each of the MD and TD, or preferably, more in the MD than in the TD.

The tenter oven temperature set points used in the preheat zones was 176° C., in the stretching zones was 140° C., and in the annealing zones was 130° C., as listed in Table 8. The film was about 0.035 mm thick and the slit widths were about 127 cm. The film was wound up at speeds of about 37.5 meters per minute. The film was slit (offline) in the machine direction into useful sample widths for testing using a razor blade cutter equipped with fresh blades.

Film properties are shown in Table 9. This example has a low puncture energy and tensile elongation, and severed easily on the blade of commercially available adhesive tape dispensers. In addition, this example was readily torn by hand even when edge-slit using sharp razor blades. The SEM shown in FIG. 19 illustrates a surface that is significantly free of voids and cracks. The SEM also shows a multitude of ridges on the surface of the film that creates a low gloss surface.

Example 57

Example 56 was repeated. Preheating temperature, T1, was increased to 180° C., stretching temperature, T2, was increased to 142° C., and annealing temperature, T3, was increased to 145° C. The film properties are shown in Table 7. This example has a low puncture energy and tensile elongation, and severed easily on the blade of commercially available adhesive tape dispensers. In addition, this example was readily torn by hand even when edge-slit using sharp razor blades. The SEM shown in FIG. 20 illustrates a surface that is significantly free of voids and cracks and a multitude of ridges on the surface of the film that creates a low gloss surface.

TABLE 6

Material Identification

| ID | General Description | Supplier | Grade | MFR* (g/10 min) | $T_m$, DSC (° C.) |
|---|---|---|---|---|---|
| PP1 | PP homo-polymer | Fina | PP 3374 | 2.5 | 161.5 |
| PP2 | PP homo-polymer | Fina | PP 3860 | 100 | 160.0 |
| PP3 | PP homo-polymer | Fina | PP 3376 | 2.5 | 161.5 |
| RCP1 | PP copolymer | Fina | PP 6253 | 1.5 | 146.2 |
| RCP2 | PP copolymer | Fina | PP 7425 | 4 | 137.8 |
| RCP3 | PP copolymer | Fina | PP 7825 | 30 | 137.5 |
| HDPE1 | HDPE | Exxon | Escorene HD6704 | 7 | 132.4 |
| HEPE2 | HDPE | Chevron | HiD ® 9640 | 0.2 | 127.5 |
| CC | Calcium Carbonate | Specialty Minerals | HiPflex ® 100 | — | — |

*Melt Flow Rate (MFR) measured at 2.16 kg and 230° C.

TABLE 7

Film Construction

| Example | Layer Construction | Secondary Layer C | Primary Layer B | Surface Layer A |
|---|---|---|---|---|
| Ex 50 | ABC | 20/40/40 CC/PP2/HDPE2 | PP1 | PP1 |
| Ex 51 | ABC | 20/40/40 CC/RCP3/HDPE2 | RCP1 | PP1 |
| Ex 52 | ABC | 20/40/40 CC/RCP3/HDPE2 | RCP1 | PP1 |
| Ex 53 | ABC | 20/40/40 CC/RCP2/HDPE2 | RCP1 | PP1 |
| Ex 54 | ABC | 20/40/40 CC/PP2/HDPE2 | RCP1 | PP1 |
| Ex 55 | ABC | 20/40/40 CC/PP2/HDPE1 | PP1 | PP1 |
| Ex 56 | ABC | 20/40/40 CC/RCP3/HDPE2 | 85/15 RCP1/PP3 | PP3 |
| Ex 57 | ABC | 20/40/40 CC/RCP3/HDPE2 | 85/15 RCP1/PP3 | PP3 |

TABLE 8

Processing Conditions

| Example | Layer Wt Percentages | T1, preheat (° C.) | T2, stretching (° C.) | T3, annealing (° C.) |
|---|---|---|---|---|
| Ex 50 | 15/70/15 | 165 | 164 | 145 |
| Ex 51 | 15/70/15 | 165 | 150 | 140 |
| Ex 52 | 15/70/15 | 165 | 142 | 140 |
| Ex 53 | 15/70/15 | 165 | 142 | 140 |
| Ex 54 | 15/70/15 | 165 | 142 | 140 |
| Ex 55 | 15/70/15 | 166 | 166 | 145 |
| Ex 56 | 10/80/10 | 176 | 140 | 130 |
| Ex 57 | 10/80/10 | 180 | 142 | 145 |

TABLE 9

Properties

| Example | Trans-mission (%) | Haze (%) | 60° Gloss (%) | Pencil writa-bility (%) | Puncture Energy 2.54 cm (J/cm$^2$) | Tensile Break Stress (MPa) | Tensile Elonga-tion (%) |
|---|---|---|---|---|---|---|---|
| Ex 50 | 92.7 | 86.0 | 7.6 | 27.0 | 32.0 | 151 | 131.5 |
| Ex 51 | 93.4 | 86.7 | 6.9 | 14.9 | 26.1 | 172 | 63.6 |
| Ex 52 | 93.4 | 85.8 | 6.9 | 18.3 | 23.0 | 183 | 60.0 |
| Ex 53 | 94.0 | 57.2 | 21.6 | | 21.3 | 188 | 54.1 |
| Ex 54 | 81.9 | 97.7 | 4.5 | | 19.6 | 172 | 43.3 |
| Ex 55 | 94.0 | 48.9 | 16.2 | | 44.0 | 141 | 154.8 |
| Ex 56 | 92.7 | 80.9 | 9.1 | | 12.2 | 141 | 49.1 |
| Ex 57 | 93.1 | 78.0 | 10.0 | | 4.8 | 67 | 43.6 |

Various modifications and alterations of this invention will become apparent to those skilled in the art without departing from the scope and principles of this invention, and it should be understood that this invention is not be unduly limited to the illustrative embodiments set forth hereinabove. All publications and patents are incorporated herein by reference to the same extent as if each individual publication or patent was specifically and individually indicated to be incorporated by reference.

What is claimed is:

1. A film comprising at least one primary layer and at least one secondary layer, wherein the primary layer is thicker than the secondary layer and additionally comprises a propylene-containing polymer having a first melting point and the secondary layer comprises a propylene-containing polymer having a second melting point, wherein the second melting point is greater than the first inciting point and the multi-layered construction is biaxially stretched, such that the stretched film exhibits a difference in birefringence wherein $\Delta_n \geq -3 \times 10^{-3}$.

2. The film according to claim 1 wherein the stretched film has a puncture energy in the machine direction (MD) of up to about 20 J/cm$^2$ when tested according to Puncture Test-2.54 cm.

3. The film according to claim 1 wherein the stretched film has a tensile elongation to break in the MD of up to about 150%.

4. The film according to claim 1 wherein the stretched film has a transmittance haze value of up to about 4%.

5. The film according to claim 1 wherein the stretched film has a tensile break strength in the MD of up to about 140 Mpa.

6. The film according to claim 1 wherein the propylene polymer of the primary layer has an initial melt flow rate of up to 25 g/10 min.

7. The film according to claim 1 wherein the biaxially oriented film has a melt flow rate of up to 35 g/10 min.

8. The film according to claim 1 wherein primary layer comprises an propylene-ethylene random copolymer having an ethylene content between about 0.5% and 10%.

9. The film according to claim 1 wherein the secondary layer comprises an isotactic polypropylene homopolymer.

10. The film according to claim 1 wherein the secondary layer comprises a propylene-ethylene random copolymer having an ethylene content between about 0.01% and 1.0%.

11. The film according to claim 1 wherein the primary layer comprises a blend, mixture or interpolymer of propylene-ethylene random copolymer having an ethylene content between about 0.5% and 10% with an isotactic polypropylene homopolymer.

12. The film according to claim 1 wherein the primary layer comprises a blend, mixture or interpolymer of propylene-ethylene random copolymer having an ethylene content between about 0.5% and 4.0% with of propylene-ethylene random copolymer having an ethylene content up to about 1%.

13. The film according to claim 1 wherein the primary layer comprises a propylene copolymer that includes a second or more monomer unit chosen from monomers having $C_2$–$C_8$ carbon atoms, the total copolymer content up to about 10%.

14. The film according to claim 1 further including a surface finishing layer.

15. A film comprising at least one primary layer and at least one secondary layer, wherein the primary layer is thicker than the secondary layer and additionally comprises a propylene copolymer having a first melting point and the secondary layer comprises a polypropylene homopolymer or copolymer having a second melting point and the second melting point is greater than the first melting point and the multi-layered construction is biaxially stretched, such that a single azimuthal scan maximum of the stretched film is within ±75° with respect to the MD, as measured by WAXS transmission azimuthal scan.

16. The film according to claim 15 wherein the stretched film exhibits a birefringence wherein the difference in birefringence is $\Delta_n \geq -3 \times 10^{-3}$.

17. The film according to claim 15 wherein the stretched film has a puncture energy in the machine direction (MD) of up to about 20 J/cm² when tested according to Puncture Test-2.54 cm.

18. The film according to claim 15 wherein the stretched film has a tensile elongation to break in the MD of up to about 150%.

19. The film according to claim 15 wherein the stretched film has a transmittance haze value of up to about 4%.

20. The film according to claim 15 wherein the stretched film has a tensile break strength in the MD of up to about 140 Mpa.

21. The film according to claim 15 wherein the propylene polymer of the primary layer has an initial melt flow rate of up to 25 g/10 min.

22. The film according to claim 15 wherein the biaxially oriented film has a melt flow rate of up to 35 g/10 min.

23. The film according to claim 15 wherein primary layer comprises an propylene-ethylene random copolymer having an ethylene content between about 0.5% and 10%.

24. The film according to claim 15 wherein the secondary layer comprises an isotactic polypropylene homopolymer.

25. The film according to claim 15 wherein the secondary layer comprises a propylene-ethylene random copolymer having an ethylene content between about 0.01% and 1.0%.

26. The film according to claim 15 wherein the primary layer comprises a blend, mixture or interpolymer of propylene-ethylene random copolymer having an ethylene content between about 0.5% and 10% with an isotactic polypropylene homopolymer.

27. The film according to claim 15 wherein the primary layer comprises a blend, mixture or interpolymer of propylene-ethylene random copolymer having an ethylene content between about 0.5% and 4.0% with of propylene-ethylene random copolymer having an ethylene content up to about 1%.

28. The film according to claim 15 wherein the primary layer comprises a propylene copolymer that includes a second or more monomer unit chosen from monomers having C2–C8 carbon atoms, the total copolymer content up to about 10%.

29. The film according to claim 15 further including a surface finishing layer.

30. A film comprising at least one primary layer and at least one secondary layer, wherein the primary layer is thicker than the secondary layer and additionally comprises a propylene copolymer having a first melting point and the secondary layer comprises a polypropylene homopolymer or copolymer having a second melting point and the second melting point is greater than the first melting point and the multi-layered construction is biaxially stretched, such that the stretched film exhibits a refractive index in the machine direction (MD) that is greater than the refractive index measured in the transverse direction (TD) and a single azimuthal scan maximum of the stretched film is within ±75° with respect to the MD, as measured by WAXS transmission azimuthal scan.

31. The film according to claim 30 wherein the stretched film exhibits a birefringence wherein the difference is $\Delta_n \geq -3 \times 10^{-3}$.

32. The film according to claim 30 wherein the stretched film has a puncture energy in the machine direction (MD) of up to about 20 J/cm² when tested according to Puncture Test-2.54 cm.

33. The film according to claim 30 wherein the stretched film has a tensile elongation to break in the MD of up to about 150%.

34. The film according to claim 30 wherein the stretched film has a transmittance haze value of up to about 4%.

35. The film according to claim 30 wherein the stretched film has a tensile break strength in the MD of up to about 140 Mpa.

36. The film according to claim 30 wherein the propylene polymer of the primary layer has an initial melt flow rate of up to 25 g/10 min.

37. The film according to claim 30 wherein the biaxially oriented film has a melt flow rate of up to 35 g/10 min.

38. The film according to claim 30 wherein primary layer comprises an propylene-ethylene random copolymer having an ethylene content between about 0.5% and 10%.

39. The film according to claim 30 wherein the secondary layer comprises an isotactic polypropylene homopolymer.

40. The film according to claim 30 wherein the secondary layer comprises a propylene-ethylene random copolymer having an ethylene content between about 0.01% and 1.0%.

41. The film according to claim 30 wherein the primary layer comprises a blend, mixture or interpolymer of propylene-ethylene random copolymer having an ethylene content between about 0.5% and 10% with an isotactic polypropylene homopolymer.

42. The film according to claim 30 wherein the primary layer comprises a blend, mixture or interpolymer of propylene-ethylene random copolymer having an ethylene content between about 0.5% and 4.0% with of propylene-ethylene random copolymer having an ethylene content up to about 1%.

43. The film according to claim 30 wherein the primary layer comprises a propylene copolymer that includes a second or more monomer unit chosen from monomers having C2–C8 carbon atoms, the total copolymer content up to about 10%.

44. The film according to claim 30 further including a surface finishing film.

45. A film comprising:
at least one primary layer and at least one secondary layer, wherein the primary layer is thicker than the secondary layer and additionally comprises a major component of a propylene-containing polymer having a first melting point and the secondary layer comprises a major component having a second melting point, the second melting point being greater than the first melting point;

wherein the multi-layered construction has been biaxially oriented so as to provide a crystalline orientation as determined by wide angle X-ray scattering (WAXS) measurements from the monoclinic (110) crystalline planes that is isotropic or exhibits at most a single specific azimuthal scan maximum, said maximum being positioned at an angle of up to ±75° from the machine direction (MD). The single azimuthal scan maximum in addition possesses an angular full width at half peak height (FWHM) between about 40° to 75°;

wherein said film has an energy to puncture parallel to the reference or MD of up to about 20 J/cm².

46. The film according to claim 45 wherein the stretched film exhibits a birefringence wherein the difference is $\Delta_n \geq -3 \times 10^{-3}$.

47. The film according to claim 45 wherein the stretched film has a puncture energy in the machine direction (MD) of up to about 20 J/cm² when tested according to Puncture Test-2.54 cm.

48. The film according to claim 45 wherein the stretched film has a tensile elongation to break in the MD of up to about 150%.

49. The film according to claim 45 wherein the stretched film has a transmittance haze value of up to about 4%.

50. The film according to claim 45 wherein the stretched film has a tensile break strength in the MD of up to about 140 Mpa.

51. The film according to claim 45 wherein the propylene polymer of the primary layer has an initial melt flow rate of up to 25 g/10 min.

52. The film according to claim 45 wherein the biaxially oriented film has a melt flow rate of up to 35 g/10 min.

53. The film according to claim 45 wherein primary layer comprises an propylene-ethylene random copolymer having an ethylene content between about 0.5% and 10%.

54. The film according to claim 45 wherein the secondary layer comprises an isotactic polypropylene homopolymer.

55. The film according to claim 45 wherein the secondary layer comprises a propylene-ethylene random copolymer having an ethylene content between about 0.01% and 1.0%.

56. The film according to claim 45 wherein the primary layer comprises a blend, mixture or interpolymer of propylene-ethylene random copolymer having an ethylene content between about 0.5% and 10% with an isotactic polypropylene homopolymer.

57. The film according to claim 45 wherein the primary layer comprises a blend, mixture or interpolymer of propylene-ethylene random copolymer having an ethylene content between about 0.5% and 4.0% with of propylene-ethylene random copolymer having an ethylene content up to about 1%.

58. The film according to claim 45 wherein the primary layer comprises a propylene copolymer that includes a second or more monomer unit chosen from monomers having C2–C8 carbon atoms, the total copolymer content up to about 10%.

59. The film according to claim 45 further including a surface finishing film.

60. An adhesive tape backing comprising:

at least one primary layer and at least one secondary layer, wherein said multi-layered construction has been biaxially oriented so as to provide a crystalline orientation as determined by wide angle X-ray scattering (WAXS) measurements from the monoclinic (110) crystalline planes that is isotropic or exhibits at most a single specific azimuthal scan maximum, said maximum being positioned at an angle of up to ±75° from the machine direction (MD), and said maximum in addition possesses an angular full width at half peak height (FWHM) between about 40° to 75°;

wherein said film has an energy to puncture parallel to the reference or MD of up to about 20 J/cm² and a transmittance haze value up to about 2%.

61. An adhesive tape backing comprising:

at least one primary layer and at least one secondary layer, wherein the primary layer is thicker than the secondary layer and additionally comprises a major component having a propylene-containing polymer having a first melting point and the secondary layer comprises a major component having a second molting point, the second melting point being greater than the first melting point;

wherein said multi-layered construction has been biaxially oriented so as to provide a crystalline orientation as determined by wide angle X-ray scattering (WAXS) measurements from the monoclinic (110) crystalline planes that is isotropic or exhibits at most a single specific azimuthal scan maximum, said maximum being positioned at an angle of up to ±75° from the machine direction (MD). The single azimuthal scan maximum in addition possesses an angular full width at half peak height (FWHM) between about 40° to 75°;

wherein said adhesive tape backing exibits a birefringence calculated by subtracting the refractive index measured in the transverse direction from that measured in the machine direction of at least about $-3 \times 10^{-3}$; and in which the primary layer polymer has an initial melt flow rate of up to 25 g/10 min.

62. An adhesive tape backing comprising:

at least one primary layer and at least one secondary layer, wherein said multi-layered construction has been biaxially oriented so as to provide a crystalline orientation as determined by wide angle X-ray scattering (WAXS) measurements from the monoclinic (110) crystalline planes that is isotropic or exhibits at most a single specific azimuthal scan maximum, said maximum being positioned at an angle of up to ±75° from the machine direction (MD), and said maximum in addition possesses an angular full width at half peak height (FWHM) between about 40° to 75°;

wherein said film has an energy to puncture parallel to the reference or MD of up to about 10 J/cm² and a transmittance haze up to about 1%.

63. An adhesive coated article comprising:

(a) a multilayered biaxially stretched film comprising,
  (i) at least one primary layer, wherein the primary layer comprises a propylene-containing polymer having a first melting point;
  (ii) at least one secondary layer, wherein the secondary layer is thinner than the primary layer and additionally comprises a propylene-containing polymer having a second melting point, such that the second melting point is greater than the first melting paint; and
(b) at least one adhesive coated layer coated on one surface of the multilayered biaxially stretched film.

64. The adhesive coated article according to claim 63 wherein the multilayered biaxially stretched film further includes:

(iii) a surface finishing layer, wherein the surface finishing layer is the outermost layer and the adhesive coasted layer is coated on the surface opposite the surface finishing layer.

65. The adhesive coated article according to claim 63 wherein the adhesive coated layer comprises a pressure sensitive adhesive.

66. The adhesive coated article according to claim 64 wherein the surface finishing layer is matte surface.

67. The adhesive coated article according to claim 66 wherein the surface finishing layer comprises a blend of incompatible polymers, wherein such blends include high density polyethylene having a first melting point and a propylene-containing polymer having a second melting point and a particulate filler.

68. The adhesive coated article according to claim 67 wherein the melting point of the propylene-containing polymer of the surface finishing layer is 2° C. lower than the orientation temperature.

69. The adhesive coated article according to claim 68 wherein the particulate filler of the surface finishing layer has a Mohs hardness of greater than or equal to 2.

* * * * *

UNITED STATES PATENT AND TRADEMARK OFFICE
CERTIFICATE OF CORRECTION

PATENT NO. : 6,638,637 B2
DATED : October 28, 2003
INVENTOR(S) : Hager, Patrick J.

It is certified that error appears in the above-identified patent and that said Letters Patent is hereby corrected as shown below:

Column 2,
Line 6, insert -- , -- before "and".

Column 3,
Line 1, after "polyethylenes" insert -- , --.
Line 7, delete "metbacrylates" and insert -- methacrylates --; therefor.

Column 4,
Line 48, delete "-3.0 x $10^{31\ 3}$" and insert -- -3.0 x $10^{-3}$ --, therefor.

Column 7,
Line 32, after "$n_M - n_T$" delete "." and insert -- , --, therefor.

Column 36,
Line 33, delete "inciting" and insert -- melting --, therefor.

Column 40,
Line 13, delete "molting" and insert -- melting --, therefor.
Line 57, delete "paint" and insert -- point --, therefor.

Signed and Sealed this

Twenty-eighth Day of December, 2004

JON W. DUDAS
*Director of the United States Patent and Trademark Office*